United States Patent
Hatakeyama

(10) Patent No.: US 6,834,511 B2
(45) Date of Patent: Dec. 28, 2004

(54) VEHICLE AIR CONDITIONING APPARATUS

(75) Inventor: Jun Hatakeyama, Sano (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 10/388,223

(22) Filed: Mar. 14, 2003

(65) Prior Publication Data

US 2004/0011068 A1 Jan. 22, 2004

(30) Foreign Application Priority Data

| Mar. 15, 2002 | (JP) | ........................................ | P2002-72788 |
| Mar. 15, 2002 | (JP) | ........................................ | P2002-72793 |
| Mar. 29, 2002 | (JP) | ........................................ | P2002-95094 |

(51) Int. Cl.[7] ............................................. F25B 29/00
(52) U.S. Cl. .......................... 62/173; 62/159; 62/228.3
(58) Field of Search ............................ 62/228.3, 228.4, 62/229, 173, 90, 202, 43, 159, 196.4; 165/42, 43

(56) References Cited

U.S. PATENT DOCUMENTS

| 5,419,149 | A |   | 5/1995 | Hara et al. |
| 5,483,805 | A | * | 1/1996 | Fujii et al. ................... 62/158 |
| 5,507,155 | A | * | 4/1996 | Negishi ...................... 62/228.4 |
| 5,634,348 | A |   | 6/1997 | Ikeda et al. |
| 5,971,287 | A |   | 10/1999 | Kettner et al. |
| 6,047,770 | A |   | 4/2000 | Suzuki et al. |
| 6,125,643 | A | * | 10/2000 | Noda et al. ................ 62/196.4 |
| 6,209,331 | B1 |   | 4/2001 | Lake et al. |
| 6,341,496 | B1 |   | 1/2002 | Kettner et al. |
| 2002/0023451 | A1 |   | 2/2002 | Kuroda et al. |
| 2002/0095943 | A1 | * | 7/2002 | Hatakeyama et al. ...... 62/324.1 |

FOREIGN PATENT DOCUMENTS

| DE | 19833251 | 4/2000 |
| DE | 19925744 | 1/2002 |
| JP | 60-000236 | 1/1985 |
| JP | 02-290475 | 4/1989 |
| JP | 04-078613 | 3/1992 |
| JP | 04-148166 | 5/1992 |
| JP | 9-175140 A | 7/1997 |
| JP | 10-44742 A | 2/1998 |

* cited by examiner

*Primary Examiner*—Marc Norman
(74) *Attorney, Agent, or Firm*—Foley & Lardner LLP

(57) ABSTRACT

A vehicle air conditioning apparatus includes a heater core 21 radiating heat of engine coolant to an air stream to be blown off to a vehicle compartment, a sub condenser 4 operative to radiate heat of compressed refrigerant to the air stream to be blown off to the vehicle compartment for condensing refrigerant, an evaporator 7 operative to allow expanded refrigerant by an expansion valve 6 to absorb heat of the air stream in the vehicle compartment to be evaporated, a variable displacement compressor 2 operative to compress evaporated refrigerant to be discharged to the condenser 4, a sensor 9 that detects a discharge refrigerant pressure of the compressor 2, and a compressor control means 100 operative to control a discharge refrigerant volume of the compressor 2 so as to compel a blow-off temperature to lie at a given temperature in response to a detected result of the sensor 9.

14 Claims, 11 Drawing Sheets

VEHICLE AIR CONDITIONING APPARATUS

BACKGROUND OF THE INVENTION

The present invention relates to a vehicle air conditioning apparatus for regulating temperature circumferences in a vehicle compartment.

In general, various attempts have heretofore been made to provide a vehicle air conditioning apparatus, for regulating temperature circumference in a vehicle compartment, that includes a refrigeration cycle operative to achieve heat exchange between refrigerant and air by circulating refrigerant, and a hot water line operative to achieve heat exchange between engine coolant and air by circulating engine coolant which is heated by waste heat of an engine.

With such an air conditioning apparatus, an inside-vehicle-compartment air flow passage into which inner and outer air streams are introduced is provided with an evaporator, that serves as a heat-absorbing inside-vehicle-compartment heat exchanger adapted to be incorporated in the refrigeration cycle, and a heater core serving as a heat radiator adapted to be incorporated in the hot water line.

Compelling heat of the air stream passing through the inside-vehicle-compartment air flow passage to be absorbed by refrigerant in the evaporator forms cold wind, whereas the air stream passing through the inside-vehicle-compartment air flow passage is heated by the heater core to form how wind. Then, regulating mixture ration between these cold wind and hot wind by means of an air mixing door allows the temperature in the vehicle compartment to be adjusted.

Also, refrigerant, that is evaporated upon absorption of heat in the evaporator, is then compressed by the compressor adapted to be driven by the engine and discharged to the main condenser, serving as an outside-vehicle-compartment heat exchanger, where heat of refrigerant is radiated and condensed whereupon refrigerant is expanded by an expansion valve, serving as an expansion valve, and subsequently delivered into the evaporator.

During such an air conditioning cycle, since the vehicle air conditioning apparatus is arranged to form hot wind by means of heating medium composed of engine coolant, under a circumstance where the temperature of engine coolant is not very high, such as a situation just after startup of the engine or a situation where a traveling load remains at a low level, an issue is encountered in that it becomes hard to rapidly raise the temperature in the vehicle compartment.

In view of such an issue, vehicle air conditioning apparatuses, disclosed Japanese Patent Application Laid-Open No. 9-175140 and Japanese Patent Application Laid-Open No. 10-44742, have inside-vehicle-compartment air flow passages each of which incorporates a sub condenser, serving as a heat-radiating inside-vehicle-compartment heat exchanger, whereby during a heating mode, refrigerant detours a main condenser to circulate through the sub condenser, an expansion valve, an evaporator and a compressor to cause heat of refrigerant in the sub condenser to be heat radiated to an air stream passing through the inside-vehicle-compartment air flow passage.

With the vehicle air conditioning apparatus with such a structure, since hot wind is generated not only by the heater core heated by heating medium composed of engine coolant but also by the sub condenser heated by heating medium composed of refrigerant, the temperature in the vehicle compartment can be raised at an increased level in a relatively short period.

Further, if a heating means is provided to heat the sub condenser, the temperature load of the sub condenser can be raised and this enables a discharge refrigerant pressure to be rapidly raised, with a resultant capability of raising the temperature in the vehicle compartment in a further rapid manner.

Also, with the air conditioning apparatus of this type, for the purpose of saving drive power, an attempt has been made to turn off a compressor clutch, serving as a coupling and uncoupling means, to disconnect the compressor from the engine at a timing when the vehicle compartment reaches a preset temperature, thereby shifting the heating mode to be achieved only by the heater core.

SUMMARY OF THE INVENTION

However, with the related art air conditioning apparatus of this type, an issue is encountered in an inability to stabilize the blow-off temperature because of probabilities where the discharge pressure of refrigerant gas discharged from the compressor at a high pressure varies in dependence on variations in load (an intake air temperature and a volume of hot wind) of the evaporator and rotational speed of the engine and where the compressor is forced to be interrupted to restrict an increase in pressure at the high pressure side for the purpose of precluding the evaporator from freezing or to protect the compressor or the refrigeration cycle.

Further, in recent years, due to improvements over the engines to operate at high efficiencies, the engine tends to provide a decreased amount of exhaust heat and, therefore, if the compressor clutch is turned off to cause the heating to be achieved only by the heater core, the blow-off temperature rapidly drops, resulting in an issue to cause a vehicle occupant to have a sense of incompatibility.

To address such an issue, although it is conceivable to use a method in which the temperature is adjusted by regulating the opening degree of an air mixing door with the compressor clutch remaining turned on, such a method undergoes another issue in reduction in power savings arising from a prolonged length of time in which the compressor is driven.

The present invention has been completed with the above issues in mind and has an object of the present invention to provide a vehicle air conditioning apparatus in which a compressor is continuously operated while contemplating to protect the compressor and a refrigeration cycle and to prevent a heat-absorbing vehicle-compartment-inward heat exchanger from freezing for thereby enabling a blow-off temperature to be stabilized while realizing power savings with an improved comfortability.

To achieve the above object, a first aspect of the present invention provides a vehicle air conditioning apparatus comprising a heat-radiating inside-vehicle-compartment heat exchanger adapted to radiate heat of compressed gas-phase refrigerant into an air stream to be blown off to a vehicle compartment for condensing refrigerant, expansion means for expanding the refrigerant condensed in the heat-radiating inside-vehicle-compartment heat exchanger, heat-absorbing inside-vehicle-compartment heat exchanger adapted to compel heat of the air stream inside the vehicle compartment to be absorbed by the refrigerant expanded by the expansion means, a variable displacement compressor adapted to be driven by an engine to compress the refrigerant evaporated in the heat-absorbing inside-vehicle-compartment heat exchanger, blow-off temperature detection means for detecting a blow-off temperature or a numeric value correlated with the blow-off temperature, and compressor control means operative to control a discharge refrigerant volume of the variable displacement compressor such that the blow-off temperature lies at a given temperature responsive to a detection result of the blow-off temperature detection means.

A second aspect of the present invention relates to a vehicle air conditioning apparatus of the first aspect and further comprises intake refrigerant pressure detection means for detecting an intake refrigerant pressure of the variable displacement compressor or a numeric value correlated with the intake refrigerant pressure, wherein the compressor control means controls a discharge refrigerant volume of the variable displacement compressor such that, in response to a detection result of the intake refrigerant pressure detection means in addition to the detection result of the blow-off temperature detection means, the blow-off temperature becomes closer to a given temperature while maintaining a compression ratio of the variable displacement compressor at a value below a given value.

A third aspect of the present invention relates to a vehicle air conditioning apparatus of the first aspect and further comprises outer and air regulator means for regulating a ratio between an inner air stream and an outer air stream to be introduced into an inside-vehicle-compartment air flow passage, an outlet temperature detection means for detecting an air temperature at an outlet of the heat-absorbing inside-vehicle-compartment heat exchanger or a numeric value correlated with the air temperature, and inner and outer air control means responsive to a detection result of the outlet temperature detection means to control the inner and outer air regulating means such that an air temperature at an outlet of the heat-absorbing inside-vehicle-compartment heat exchanger lies at a given value.

A fourth aspect of the present invention relates to a vehicle air conditioning apparatus of the first aspect and further comprises inner and outer air regulating means that regulates a ratio between inner and outer air streams to be introduced into the inside-vehicle-compartment air flow passage, heating temperature detection means that detects a heating temperature of the heating means or a numeric value correlated with the heating temperature, inlet temperature detection means that detects an air temperature at an inlet of the heat-absorbing inside-vehicle-compartment heat exchanger or a numeric value correlated with the air temperature, and inner and outer air control means operative to calculate a target air temperature at an inlet of the heat-absorbing inside-vehicle-compartment heat exchanger for causing an air temperature at an outlet of the heat-absorbing inside-vehicle-compartment heat exchanger to lie at a given temperature in response to a detection result of the heating temperature detection means while controlling the inner and outer air regulating means for causing an air temperature at an inlet of the heat-absorbing inside-vehicle-compartment heat exchanger to lie at the target air temperature in response to a detection result of the inlet air temperature detection means.

DETAILED DESCRIPTION OF THE PREFERRED EMBODIMENT

Figure 1:
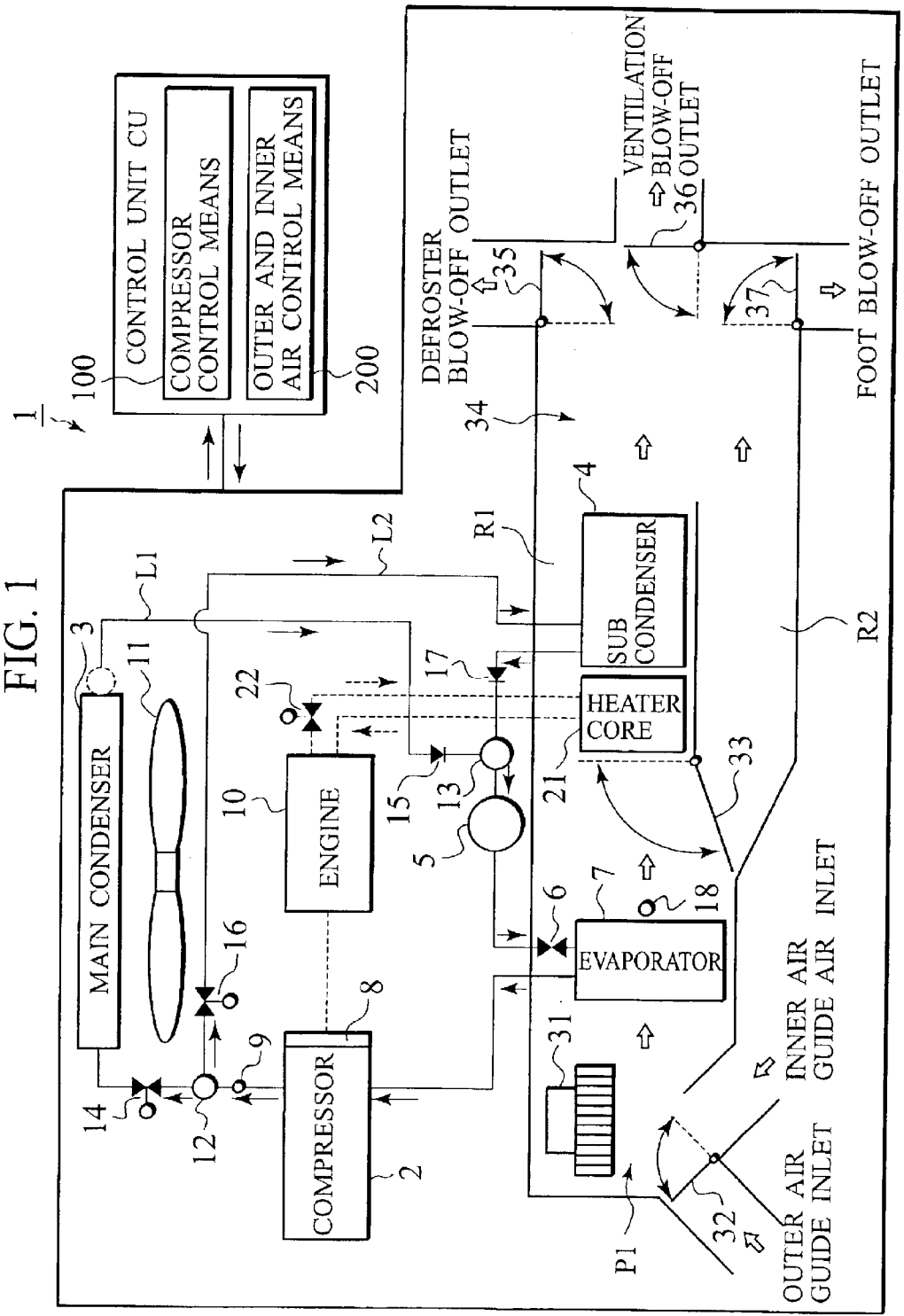
FIG. 1 is a schematic structural view of a vehicle air conditioning apparatus of a first embodiment according to the present invention.

Now, embodiments of the present invention are described below. FIG. 1 is a schematic structural view of a vehicle air conditioning apparatus 1 of a first embodiment according to the present invention. The vehicle air conditioning apparatus 1 is comprised of a refrigeration cycle adapted to circulate refrigerant to achieve heat exchange between refrigerant and an air stream, and a hot water line adapted to circulate engine coolant heated by waste heat of an engine to perform heat exchange between engine coolant and the air stream.

The refrigeration cycle is comprised of a compressor 2, a main condenser 3, a sub condenser 4 serving as a heat-radiating inside-vehicle-compartment heat exchanger, a liquid tank 5, an expansion valve 6 serving as an expansion means, and an evaporator 7 serving as a heat-absorbing inside-vehicle-compartment heat exchanger, all of which are connected in communication with one another via a piping system to allow refrigerant, exerted with kinetic energy by the compressor 2, to circulate through the piping system.

The compressor 2 is located outside a vehicle compartment, like in an engine room, and compresses low pressure gas-phase refrigerant, that has been suctioned, to high pressure gas-phase refrigerant to be discharged. The compressor 2 is connected to a crank shaft of an engine 10 via a compressor clutch 8, serving as a coupling and uncoupling means, and applied with and driven by an engine power output. The compressor 2 is of a swash plate type, with an inclination of a swash plate being controlled responsive to an electric signal applied from an external signal source.

That is, though not shown, the compressor 2 has an electronically actuated control valve (ECV) such as an electromagnetic valve that is externally controlled responsive to the electric signal. That is, when using the electromagnetic valve, as the ECV, that communicates with a high pressure side, the crank case and a low pressure side communicate with one another via a passage which is opened at a given opening degree, and the pressure in the crank case escapes to the low pressure side. Accordingly, by turning on or turning off the electromagnet valve and introducing or interrupting pressure at the high pressure side to control the pressure inside the crank case, a pressure balance to be exerted to a piston is varied to change an inclined angle of the swash plate for thereby controlling a refrigerant discharge volume of the compressor 2. Thus, the compressor 2 serves a variable displacement compressor.

When this takes place, the electromagnet valve is applied with a duty signal, as an external electric signal, having a duty ratio in a suitable value from a control unit CU that controls entire operation of the vehicle air conditioning apparatus 1. When desired to decrease the refrigerant discharge volume, the duty signal having a large duty ratio is applied to the electromagnet valve whose valve-opening time interval is extended to cause the pressure in the crank case to increase. In contrast, when desired to increase the refrigerant discharge volume, the duty signal having a small duty ratio is applied to the electromagnet valve whose valve-opening time interval is shortened to cause the pressure in the crank case to decrease The main condenser 3 is located outside the vehicle compartment and serves to radiate heat of high temperature and high pressure gas-phase refrigerant discharged from the compressor 2 to the atmosphere. By driving a blower means such as an electric fun, a outer air is blown off to the main condenser 3. Upon performing heat exchange between high temperature and high pressure gas-phase refrigerant flowing through the main condenser 3 and the outer air to be blown off to the main condenser 3, the main condenser 3 radiate heat of high temperature and high pressure gas-phase refrigerant to the atmosphere.

The sub condenser 4 is located in an inside-vehicle-compartment air flow passage P1, which will be described later, and serves to radiate heat of high temperature and high pressure gas-phase refrigerant, discharged from the compressor 2, to the air stream passing through the inside-vehicle-compartment air flow passage P1. The air stream passing through the inside-vehicle-compartment air flow passage P1 serves to absorb heat of refrigerant heat radiated by the condenser 4 and generates hot wind that flows downstream the inside-vehicle-compartment air flow passage P1.

By the way, with the vehicle air conditioning apparatus 1, the main condenser 3 and the sub condenser 4 are connected in parallel and configured such that the main condenser 3 and the sub condenser 4 are selectively used. That is, a flow passage through which refrigerant discharged from the compressor 2 flows is branched off via a three-way connector 12 to a first refrigerant line L1, which communicates through the main condenser 3, and a second refrigerant line L2 which communicates through the sub condenser 4. And, the first refrigerant line L1 and the second refrigerant line L2 confluences via a three-way connector 13 at a preceding stage of the liquid tank 5. Also, connected between the three-way connector 12 and the compressor 2 is a sensor 9 that serves as a detecting means to detect discharge refrigerant pressure discharged from the compressor 2.

An electromagnetic valve 14 is located in the first refrigerant line L1, at a preceding stage of the main condenser 3, in which a check valve 15 is also disposed at a trailing stage of the main condenser 3. Likewise, an electromagnetic valve 16 is located in the first refrigerant line L1, at the preceding stage of the sub condenser 4, in which a check valve 17 is also disposed at a trailing stage of the sub condenser 4. And, changing over opening and closing states of the electromagnetic valve 14 disposed in the first refrigerant line L1 and opening and closing states of the electromagnetic valve 16 disposed in the second refrigerant line L2 through the use of the control unit CU enables the first refrigerant line L1 or the second refrigerant line L2 to be selected for use.

In particular, during an air-conditioning mode, the control unit CU is operative to set the electromagnetic valve 14 disposed in the first refrigerant line L1 in an "OPEN" mode and the electromagnetic valve 16 disposed in the second refrigerant line L2 in an "OFF" mode. This causes the first refrigerant line L1 to be selected, thereby permitting refrigerant discharged from the compressor 2 to be supplied to the main condenser 3. On the contrary, during a heating mode, the control unit CU is operative to set the electromagnetic valve 14 disposed in the first refrigerant line L1 in an "OFF" mode and the electromagnetic valve 16 disposed in the second refrigerant line L2 in an "OPEN" mode. This causes the second refrigerant line L2 to be selected, thereby permitting refrigerant discharged from the compressor 2 to be supplied to the sub condenser 4

As set forth above, with the vehicle air conditioning apparatus 1, the control unit CU serves as a change-over means that selectively changes over between the first refrigerant line L1 and the second refrigerant line L2 such that the flow passages of refrigerant discharged from the compressor 2 are changed over during the air-conditioning mode and the heating mode for thereby allowing the main condenser 3 and the sub condenser 4 to be selectively used.

The liquid tank 5 serves to temporarily store refrigerant that is heat radiated by the main condenser 3 or the sub condenser 4 to be lowered in temperature and liquefied. The liquid tank 5 is equipped with a dust filter and has a function to remove dusts contained in stored liquid refrigerant. Also, although it is preferable for the liquid tank 5 to be disposed in the trailing stage of the three-way connector 13, if a difficulty is encountered in locating the liquid tank 5 in the trailing stage of the three-way connector 13 because of a restriction encountered by a pipeline layout in the engine room, the liquid tank 5 may be located just after the main condenser 3 or unitarily located with the main condenser 3. In this case, refrigerant heat radiated by the sub condenser 4 and converted into liquid is directly supplied to the expansion valve 6 without intervening the liquid tank 5.

Figure 3:
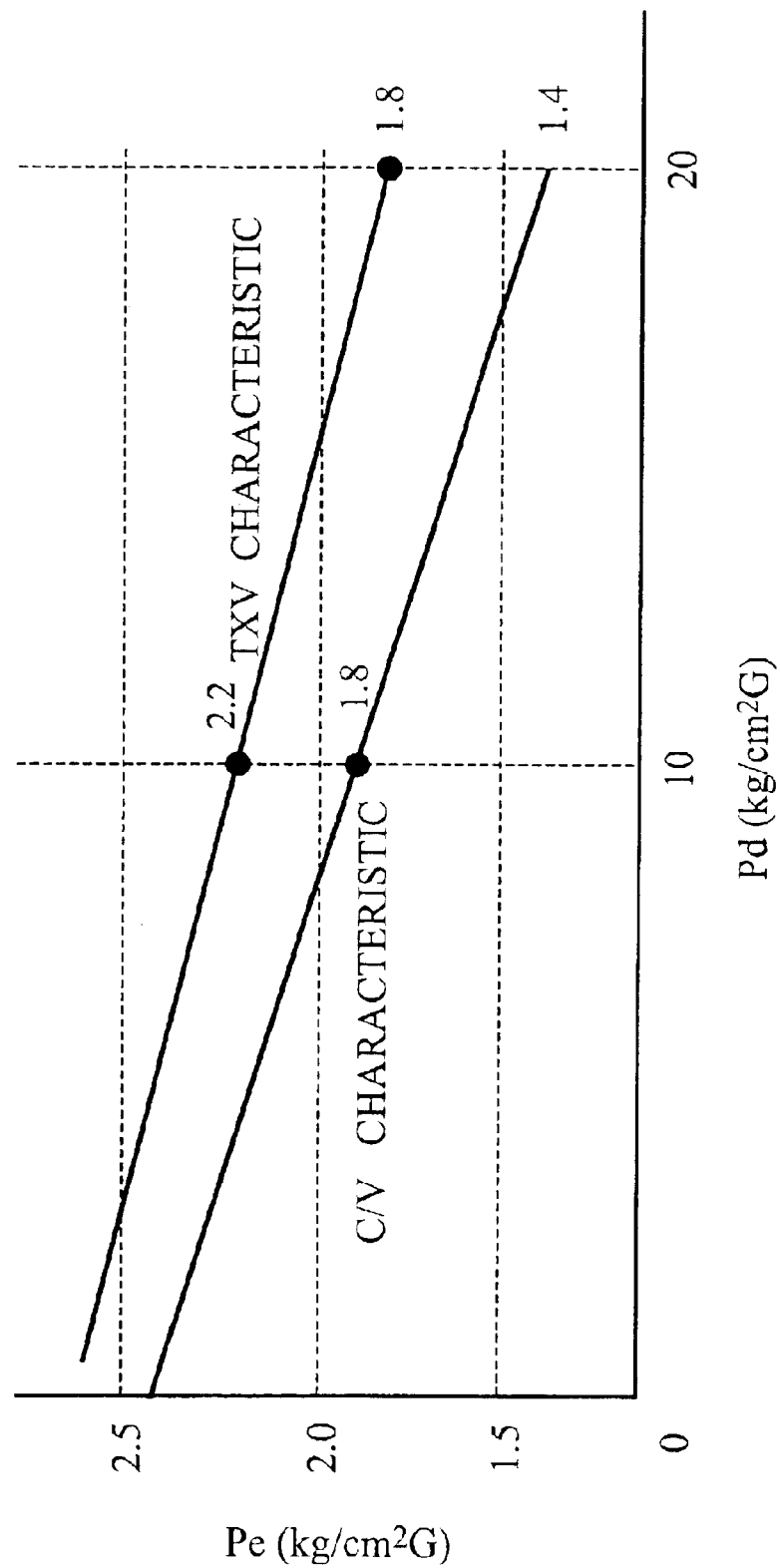
FIG. 3 is a graph showing the relationship between a valve-opening characteristic of an expansion valve and a control valve characteristic of a variable displacement compressor.

The expansion valve 6 serves to rapidly expand liquid refrigerant heat radiated by the main condenser 3 or the sub condenser 4 and temporarily stored in the liquid tank 5 to produce low temperature and low pressure mist-like refrigerant which in turn is delivered to the evaporator 7. The expansion valve 6 is of a temperature type in which a set value (=refrigerant pressure at the outlet of the evaporator 7) is varied depending on the high pressure As shown in FIG. 3, in an operational practical range (of $Pd=0\sim30$ $kg/cm^2G$) in a graph where the ordinates axis represents an outlet refrigerant pressure Pe of the evaporator 7 and the abscissa axis represents the discharge refrigerant pressure Pd of the compressor 2, a valve-opening characteristic TXV of the expansion valve 6 lies in an upper area above a control valve characteristic C/V of the compressor 2 and does not intersect C/V, while having a tendency with the valve-opening characteristic TXV sloping downward in proportion to an increase in Pd.

In the absence of intersection between TXV and C/V, control interference area, that causes malfunction such as hunting, can be dispensed with. Also, during high load, the preset value of the expansion valve is lowered to appropriately remove super heat, resulting in a improvement over a cooling capability with a reduction in the flow rate of refrigerant for thereby saving required drive power. On the contrary, during low load, a refrigerant stream flows through an entire area at an optimum flow rate, and a whole of the evaporator 7 tends to have an improved temperature distribution with no imbalance being caused such that an efficient cooling can be expected. Also, during the heating mode, since the flow rate of refrigerant can be increased to increase a buildup in Pd at an initial startup stage of the compressor 2 or in a transition period where Pd remains at a low level and super heat can be appropriately removed in a stable stage where Pd is close to a value of 20, it is effective to restrict a de-stroke phenomenon caused by feedback of liquid. Moreover, due to the above effect, a single expansion valve is enabled to establish an air conditioning and heating cycle, resulting in a reduction in the number of component parts for the cycle and lowered costs.

The evaporator 7 is disposed in the inside-vehicle-compartment air flow passage P1 at an upstream side of the sub condenser 4 to cause low temperature and low pressure mist-like refrigerant, supplied from the expansion valve 6, to absorb heat from the air stream passing through the inside-vehicle-compartment air flow passage P1.

Refrigerant supplied to the evaporator 7, from the expansion valve 6, in the low temperature and low pressure mist form takes heat from the air stream passing through the inside-vehicle-compartment air flow passage P1, when flowing through the evaporator 7, and is vaporized. Then, gas-phase refrigerant is drawn into the compressor 2 and compressed again to be discharged. On the other hand, the air stream, whose heat is absorbed by refrigerant in the compressor 2, is dehumidified to form cold wind that flows into a downstream side of the inside-vehicle-compartment air flow passage P1. Also, disposed in the vicinity of the outlet of the evaporator 7 is a sensor 18 that serves as an outlet temperature detection means to detect the temperature of the air stream passing through the evaporator 7.

The refrigeration cycle allows refrigerant to be circulated in a manner set forth above to enable heat exchange in the main condenser 3, the sub condenser 4 and the evaporator 7 such that hot wind or cold wind are generated in the inside-vehicle-compartment air flow passage P1.

The hot water line serves to achieve heat exchange by circulating engine coolant, that develops at a high temperature due to waste heat of the engine, and incorporates therein a heater core 21 that serves as a heat radiator.

The heater core 21 is disposed, together with the sub condenser 4, in the inside-vehicle-compartment air flow passage P1 downstream the evaporator 7 to allow coolant, supplied from a water jacket of the engine 10 via the piping component, that is, engine coolant develops at the high temperature due to waste heat of the engine, to serve as heating medium through which heat is radiated to the air stream due to retained heat of engine coolant. When this takes place, the air stream passing through the inside-vehicle-compartment air flow passage P1 absorbs heat from the heater core 21 in addition to heat of refrigerant that is heat radiated by the sub condenser 4 as set forth above. This allows hot wind to be effectively generated in the inside-vehicle-compartment air flow passage P1. Also, a water valve 22 is located in the piping component adapted to supply engine coolant from the water jacket of the engine 10 to the heater core 21 and adjusted by the control unit CU set forth above for thereby regulating the flow rate of engine coolant to be supplied to the heater core 21, that is, the amount of heat radiation to be effectuated by the heater core 21.

By the way, with the vehicle air conditioning apparatus 1, the sub condenser 4, serving as the heat-radiating inside-vehicle-compartment heat exchanger, is located in a position available to receive heat from the heater core 21. Here, "the position available to receive heat from the heater core 21" is meant by a position in that heat is transferred from the heater core 21 even under a condition where no air stream exists in inside-vehicle-compartment air flow passage P1. In particular, in a case where the sub condenser 4 is located in an extremely close proximity to the heater core 21 and in a case where the sub condenser 4 and the heater core are formed in a unitary structure, the sub condenser 4 is available to receive heat from the heater core 21.

Thus, by locating the sub condenser 4, forming the heat-radiating inside-vehicle-compartment heat exchanger, at the position available to receive heat from the heater core 21, the temperature load of the sub condenser 4 is increased to enable the discharge refrigerant pressure Pd to be rapidly raised and, so, a highly preferable fast response heating performance can be exhibited. Also, in order to preferably have a further fast response heating performance, it is desired for the heater core 21 to be located in the inside-vehicle-compartment air flow passage P1 at the upstream side of the sub condenser 4.

That is, in a case where the heater core 21 is disposed downstream the sub condenser 4, the air stream is introduced through the inside-vehicle-compartment air flow passage P1 and passes through the evaporator 7 to convert the air stream into cold wind that is brought into direct contact with the sub condenser 4, with a resultant decrease in the temperature load of the sub condenser 4 such that it is hard for the refrigerant discharge pressure to increase. On the contrary, in a case where the heater core 21 is disposed upstream the sub condenser 4, the air stream, converted into cold wind by the evaporator 7, is brought into contact with the sub condenser 4 via the heater core 21, and the temperature load of the sub condenser 4 is not so lowered to enable the refrigerant discharge pressure to be increased at a further high speed. In this case, also, since heat of the heater core 21 can be transferred to the sub condenser 4 by means of the air stream passing through the inside-vehicle-compartment air flow passage P1, a transfer efficiency of heat to be transferred from the heater core 21 to the sub condenser 4 becomes more excellent and an extremely favorable fast response heating performance can be exhibited.

Further, in order for the fast response heating performance to be further excellent, it is preferred for the sub condenser 4, serving as the heat-radiating inside-vehicle-compartment heat exchanger, and the heater core 21 to be formed in a unitary structure.

Thus, in a case where the sub condenser 4 and the heater core 21 are formed in the unitary structure, since heat of the heater core 21 comes to be directly transferred to the sub condenser 4, the transfer efficiency of heat to be transferred from the heater core 21 to the sub condenser 4 becomes further excellent and an extremely improved fast response heating performance can be exhibited.

Further, the presence of the unitary structure between the sub condenser 4 and the heater core 21 is extremely advantageous in view of miniaturization and low costs. Here, as a method of forming the sub condenser 4 and the heater core 21 in the unitary structure, it is conceivable that the sub condenser 4 and the heater core 21 have common fins which are unitarily formed.

A blower fan 31 is located at the upstream side in the inside-vehicle-compartment air flow passage P1. Driving this blower fan 31 allows a outer air to be introduced through an outer air guide inlet into the inside-vehicle-compartment air flow passage P1 or allows the inner air stream to be introduced through an inner air guide inlet into the inside-vehicle-compartment air flow passage P1. Also, an intake door 32 is disposed, as an inner and outer air regulating means, in the vicinity of the outer air guide inlet and the inner air guide inlet, and drivingly controlling the intake door 32 regulates a ratio of outer air and inner air to be introduced into the inside-vehicle-compartment air flow passage P1.

The air stream, introduced into the inside-vehicle-compartment air flow passage P1 from the outer air guide inlet or the inner air guide inlet, first passes through the evaporator 7 disposed in the upstream area of the inside-vehicle-compartment air flow passage P1. When this takes place, as set forth above, heat of the air stream passing through the evaporator 7 is absorbed by refrigerant in the evaporator 7 and dehumidified, thereby forming cold wind which in turn flows in the downstream.

The inside-vehicle-compartment air flow passage P1 is diverged, at the downstream area thereof, into a hot wind flow passage R1, in which the heater core 21 and the sub condenser 4 are located, and a roundabout flow passage R2 that detours the heater core 21 and the sub condenser 4. The air stream passing through the hot wind flow passage R1 absorbs heat from the heater core 21 when passing through the heater core 21, as set forth above, and, when further passing through the sub condenser 4, absorbs heat radiated by refrigerant in the sub condenser 4 to generate hot wind which in turn flows in the downstream. On the other hand, the air stream entering the roundabout flow passage R2 flows downstream as cold wind under a state wherein heat of the air stream has been absorbed by refrigerant in the evaporator 7.

Here, located at a diverging point between the hot wind flow passage R1 and the roundabout flow passage R2 is an the air stream mixing door 33 that serves to adjust a ratio between the flow rate of the air stream passing through the hot wind flow passage R1 and the flow rate of the air stream passing through the roundabout flow passage R2. And, drivingly controlling the air stream mixing door 33 so as to adjust the ratio between the flow rate of the air stream passing through the hot wind flow passage R1 and the flow rate of the air stream passing through the roundabout flow passage R2 enables the temperature of the air stream, to be blown off from a defroster blow-off outlet, a ventilation blow-off outlet and a foot blow-off outlet, to be finally regulated.

An air mixing chamber 34 is located in the inside-vehicle-compartment air flow passage P1 at a further downstream side of the hot wind flow passage R1 and the roundabout flow passage R2 to mix hot wind flowing through the hot wind flow passage R1 and cold wind flowing through the roundabout flow passage R2. Disposed in the air mixing chamber 34 are the defroster blow-off outlet adapted to allow the air stream, in which hot wind and cold wind are mixed and the temperature is adjusted, to be blown off to a front window glass, the ventilation blow-off opening to allow the air stream to be blown off to the upper half of a body and the foot blow-off opening to allow the air stream to be blown off to the foots of an occupant. In the vicinities of the respective blow-off openings, a defroster door 35, a ventilation door 36 and a foot door 37 are located and are drivingly controlled to adjust the flow rates of the air streams to be blown off from the respective blow-off openings.

With the vehicle air conditioning apparatus 1 thus structured as set forth above, since the air stream, that is dehumidified when passing through the evaporator 7, is heated by the heater core 21 and the sub condenser 4 to generate hot wind, it is possible even to dehumidify the air stream during the heating mode.

Further, with the vehicle air conditioning apparatus 1, since, in addition to the heater core 21, the sub condenser 4 forming the heat-radiating inside-vehicle-compartment heat exchanger is disposed in the inside-vehicle-compartment air flow passage P1 such that hot wind is generated not only by the heater core 21 but also by the sub condenser 4, even in a case where engine coolant is not raised at a sufficiently high temperature, it is possible to raise the temperature of the vehicle compartment at a relatively high speed. Also, with a view to saving the drive power, at a time when engine coolant reaches a given temperature, the compressor clutch 8 is turned off to shift the heating in a mode using only the heater core 21.

Figure 2:
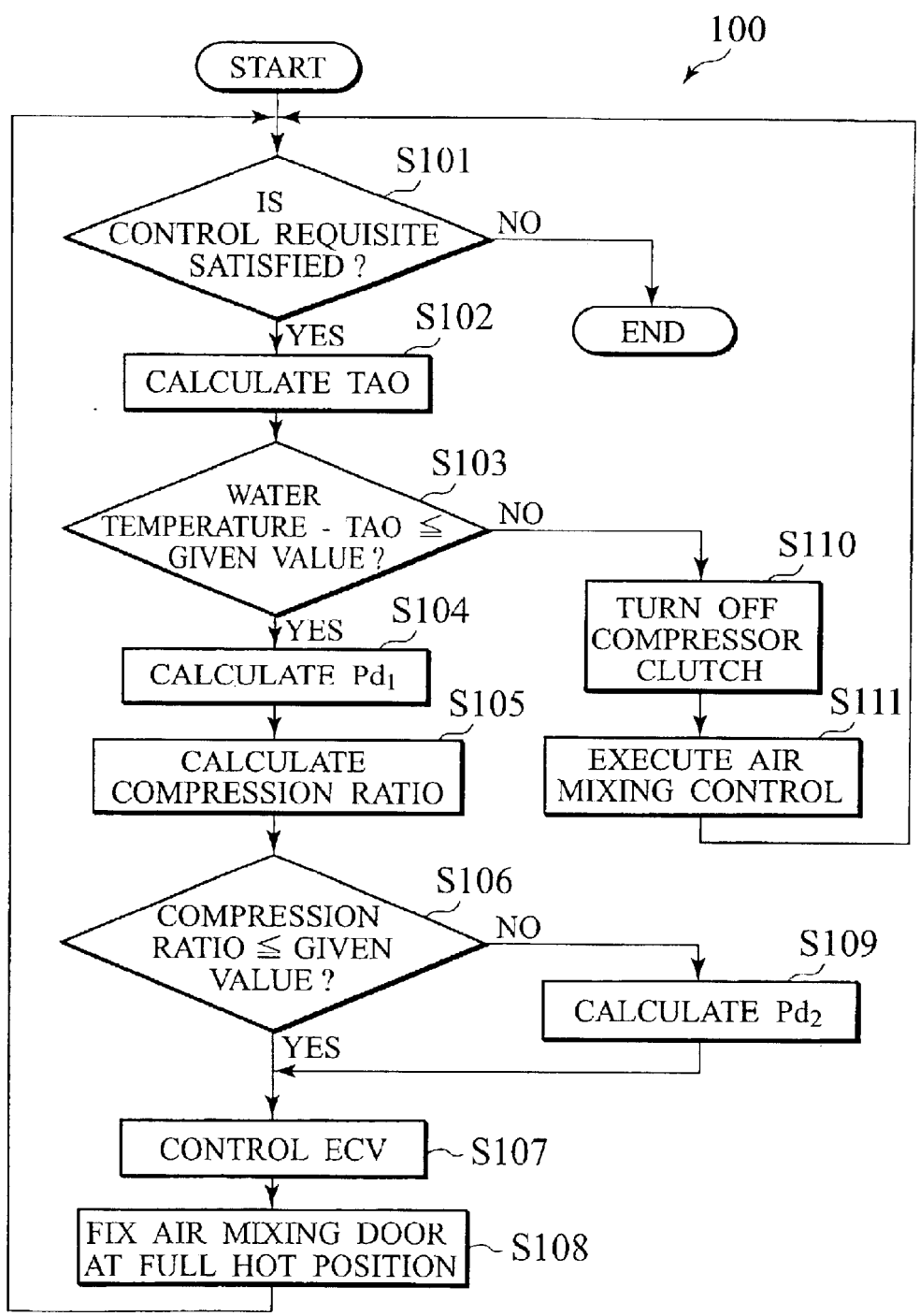
FIG. 2 is a flowchart illustrating a control sequence of the vehicle air conditioning apparatus to be executed by a compressor control means.

Further, the vehicle air conditioning apparatus 1 includes a compressor control means 100 to stabilize the blow off temperature in the heating mode while maintaining the compression ratio of the compressor 2 at a value below a given value, and the compressor control means 100 is formed by a program stored in a memory of the control unit CU. FIG. 2 is a flowchart illustrating a control sequence to be executed in the vehicle air conditioning apparatus 1 by means of the compressor control means 100.

As shown in the figure, if the program starts, first, discrimination is made to see whether a control prerequisite of the vehicle air conditioning apparatus 1 is satisfied (step S101). The control prerequisite is judged based on data such as an ON/OFF state of an ignition switch, an ON/OFF state of an air conditioning switch and an operation permit and non-permit state of ECV. In particular, if the ignition switch remains in a turned-on state, the air conditioning switch remains in a turned-on state and the ECV remains in an operation permit state, the control unit CU discriminates that the control prerequisite is satisfied and the following control is executed. Also, in the absence of the control prerequisite, control is terminated.

In the presence of the control prerequisite, operation is implemented to calculate a target blow-off temperature (TAO) (step S102). The TAO is for the temperature inside the vehicle compartment to be settled to a setting temperature (the temperature of the vehicle compartment which the occupant desires) that is inputted via an operation panel which is not shown and calculated on the basis of detected values obtained by an atmospheric temperature sensor, a room temperature sensor and a solar radiation sensor.

Next, operation is executed to discriminate whether control effectuating condition is satisfied. That is, operation is executed to calculate a difference between the water temperature, detected by a water temperature sensor (not shown) that detects the water temperature of engine coolant, and TAO and, if resulting value is below a given value, it is discriminated that the control effectuating condition is satisfied (step S103) whereupon operation is executed to calculate a target refrigerant discharge pressure $Pd_1$ corresponding to TAO (step S104).

This value is determined such that the temperature of the air stream at the outlet of the sub condenser 4 is maintained at TAO. TAO is determined to fall in a range of 30~60° C., and the target refrigerant discharge pressure $Pd_1$ is determined to lie in a range of 10~20 kg/cm$^2$G. As one example, when TAO is 30° C., the first target refrigerant discharge pressure $Pd_1$ is 10 kg/cm$^2$G, and when TAO is 55° C., the target refrigerant discharge pressure $Pd_1$ is set to 18 kg/cm$^2$G.

Subsequently, operation is implemented to calculate the pressure Pe (substantially equal to an intake refrigerant pressure of the compressor 2) of refrigerant in the evaporator 7 from the air temperature $T_{int}$ detected by the sensor 18, at the outlet of the evaporator 7, and the compression ratio between Pe and $Pd_1$ is calculated (step S105). In succeeding step, discrimination is made to see whether this compression ratio is below a given value (of approximately 7~8) (step S106) and, if the compression ratio is below the given value, ECV of the compressor 2 is controlled to allow the detected value of the sensor 9 reaches Pd1 (step S107). Further, the air stream mixing door 33 is fixed at a position (a full HOT position) to permit the air stream passing through the inside-vehicle-compartment air flow passage P1, to be introduced only into the hot wind flow passage R1 as shown by a solid line in FIG. 1 (step S108).

Also, in step S106, if the compression ratio is greater than the given value, the second target refrigerant discharge pressure $Pd_2$ is calculated (step S109) to allow the compression to reach the given value (step S109), and ECV of the compressor 2 is controlled such that the detected value of the sensor 9 reaches $Pd_2$.

Figure 4:
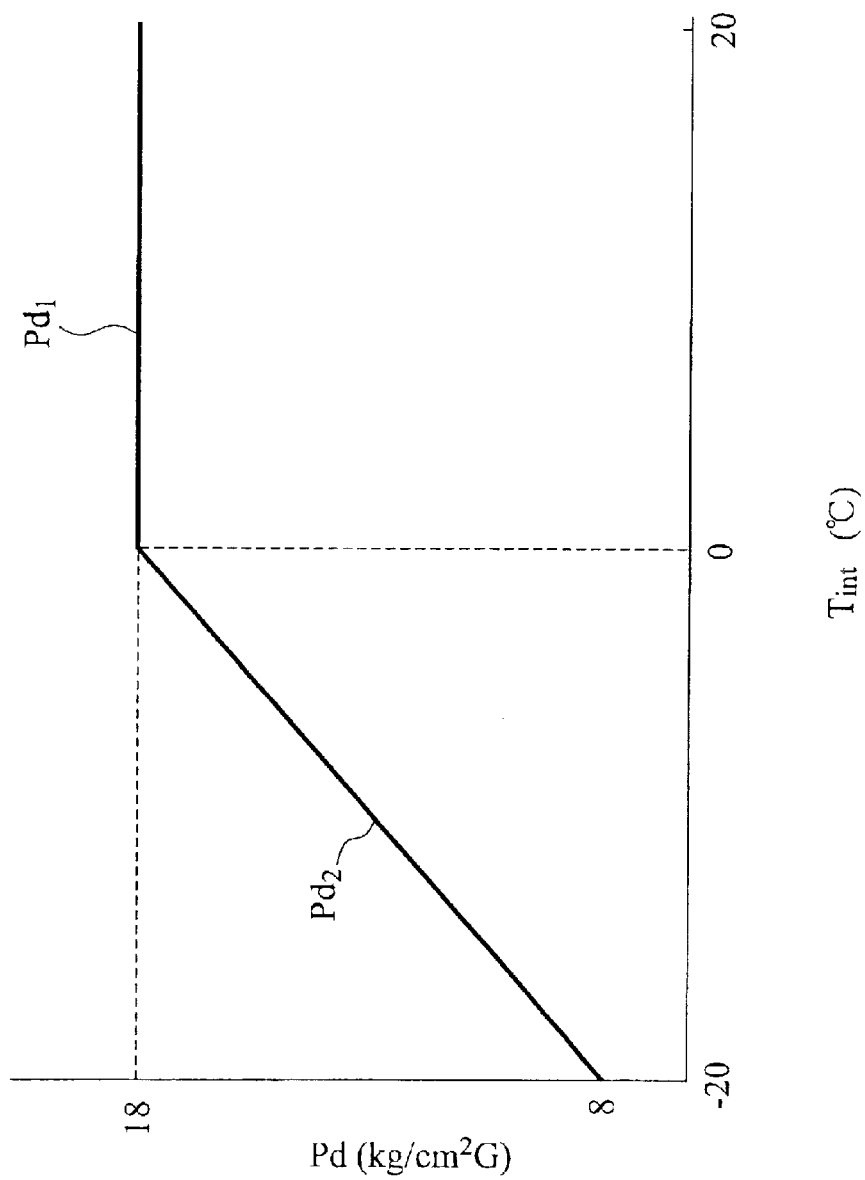
FIG. 4 is a graph showing the relationship between the temperature of an air stream at an outlet of an evaporator and a target refrigerant discharge pressure of the variable displacement in a case where a target blow-off temperature lies at a level of 55° C.

FIG. 4 is a graph illustrating the relationship between the air temperature $T_{int}$ at the outlet of the evaporator 7 and the target refrigerant discharge pressure Pd of the variable displacement compressor 2 when TAO remains at 55° C. Also, when TAO is 55° C., the first target refrigerant discharge pressure $Pd_1$ is 18 kg/cm$^2$G. As shown in the figure, the target refrigerant discharge pressure Pd lies at a level $Pd_1$ when the air temperature $T_{int}$ at the outlet of the evaporator 7 is greater than 0° C., and when the air temperature $T_{int}$ is less than 0° C., the target refrigerant discharge pressure $Pd_2$ varies in proportion to $T_{int}$.

In such a way described above, after the ECV has been controlled, flow is routed back to step S101 to repetitively execute the above described steps. Also, in a case where the engine temperature is raised and, in step S103, the difference between the water temperature of engine coolant and TAO exceeds the given value, the compressor clutch 8 is turned off to allow the heating mode to be achieved only by the heater core 21 (step S110), and operation is shifted to the air stream mixing control mode wherein the opening angle of the air stream mixing door 33 is regulated to permit the air stream passing through the inside-vehicle-compartment air flow passage P1, to flow into the hot wind flow passage R1 and the roundabout flow passage R2 as two air streams which are then mixed in the air mixing chamber 34 (step S111)

Figure 5:
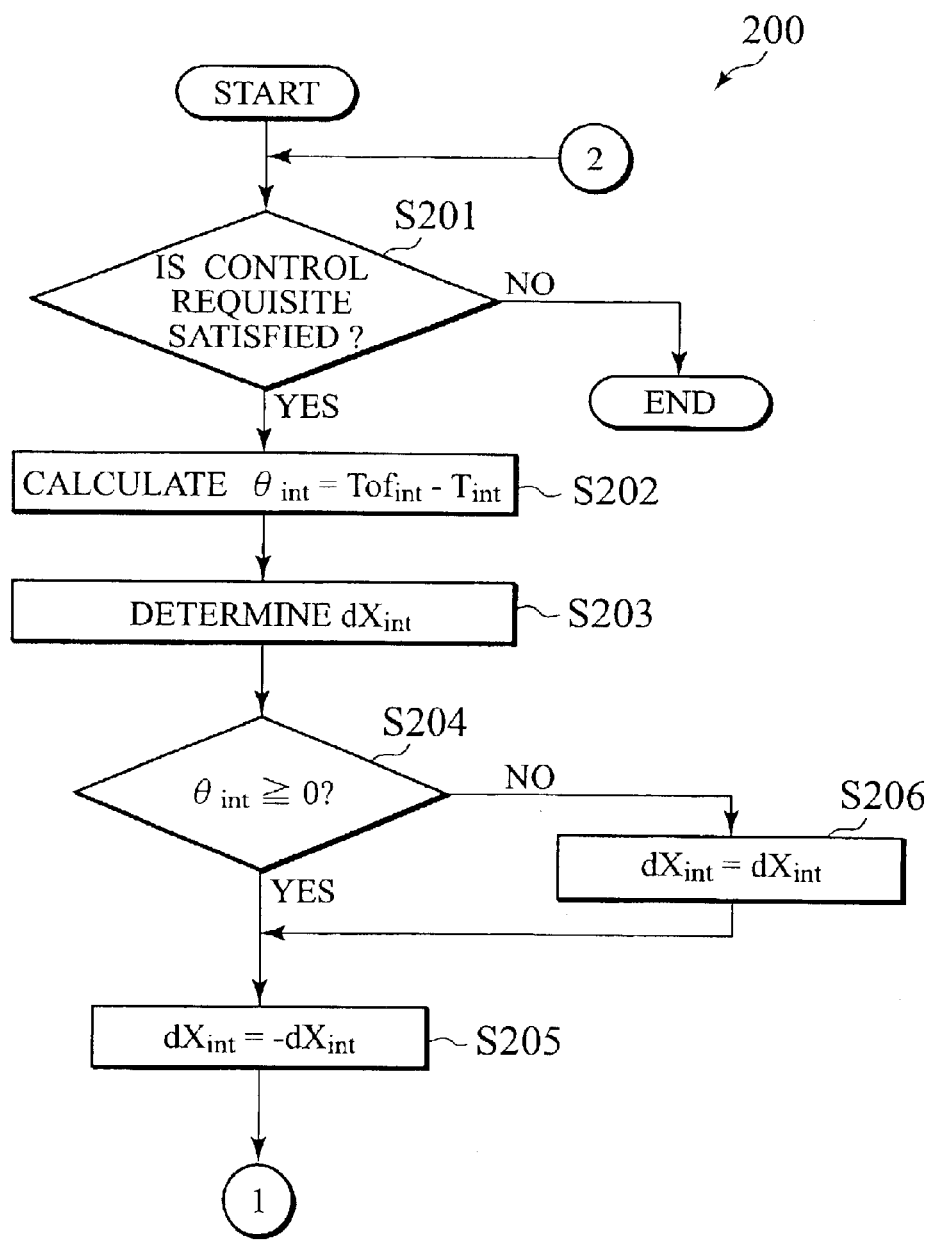
FIG. 5 is a flowchart illustrating a control sequence of an intake door to be executed by an inner and outer air control means of the first embodiment.
Figure 6:
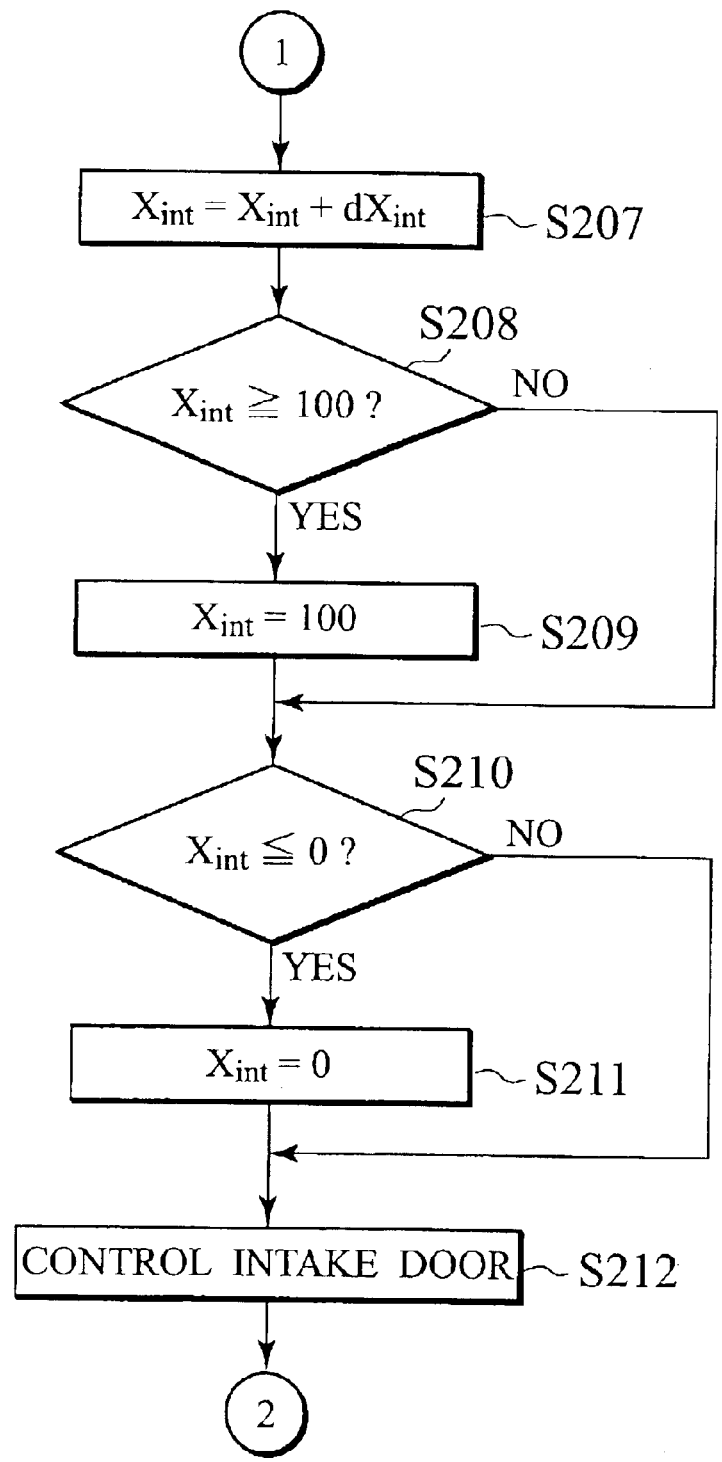
FIG. 6 is a flowchart illustrating a control sequence of the intake door to be executed by the inner and outer air control means of the first embodiment.

Further, the vehicle air conditioning apparatus 1 includes an inner and outer air control means 200 to maintain the temperature of the air stream flowing at the outlet of the evaporator at a given value and is formed by a program stored in the memory of the control unit CU. FIGS. 5 and 6 are flowcharts illustrating control sequences of the intake door 32 to be executed by the inner and outer air control means 200.

As shown in the figures, if the program starts, first, discrimination is made to see whether the control prerequisite of the vehicle air conditioning apparatus 1 is satisfied (step S201). The control prerequisite includes the sama factors as those of step S101 of the compressor control means 100 and, if the control unit CU discriminates that the control prerequisite is satisfied, then the following control is executed whereas, in the absence of the control prerequisite, control is terminated.

In the presence of the control prerequisite, operation is implemented to calculate a difference $\theta_{int}$ between the target air temperature $Tof_{int}$ and the temperature $T_{int}$ of the air stream at the outlet of the evaporator 7, actually detected by the sensor 18 (step S202). Also, $Tof_{int}$ is set to a temperature that is slightly lower than 0° C., that is, in a temperature range of –1~2° C. and, more preferably, in a temperature range of approximately 0~1° C.

Next, on the basis of calculated $\theta_{int}$, the amount $dX_{int}$ of displacement of the intake door 32 is set (step S203). $X_{int}$ represents a numeric value indicative of the opening and closing states of the outer air guide inlet and the inner air guide inlet controlled by the intake door 32 and varies in a range of 0~100 (%) wherein a status where the intake door 32 fully closes the inner air guide inlet while fully opening the outer air guide inlet is assigned to 100 and a reversed state to 0.

Subsequently, discrimination is executed to see whether $\theta_{int}$ exceeds a level of 0 (step S204) and, if $\theta_{int}$ is greater than 0 (that is, $T_{int}$ is lower than $Tof_{int}$), since the rate of the inner air stream needs to increase, $dX_{int}$ is converted to a negative value so as to allow the intake door 32 to be shifted in a direction to open the inner air guide inlet (step S205). On the contrary, if $\theta_{int}$ is less than 0 (that is, $T_{int}$ is higher than $Tof_{int}$), since the rate of outer the air stream needs to increase, $dX_{int}$ remains in the positive value so as to allow the intake door 32 to be shifted in a direction to open the outer air guide inlet (step S206).

In succeeding step, $dX_{int}$ is added to $X_{int}$ to provide new $X_{int}$ (step S207), and discrimination is executed to see whether $X_{int}$ exceeds a value of 100 (step S208) whereupon if $X_{int}$ exceeds a value of 100, then $X_{int}$ is assigned as 100 (step S209). Also, discrimination is executed to see whether $X_{int}$ is less than a value of 0 (step S210) whereupon if $X_{int}$ is less than a value of 0, then $X_{int}$ is assigned as 0 (step S211). After the intake door 32 has been drivingly controlled on the basis of $X_{int}$ thus obtained (step S212), flow is routed back to step S201 and the above steps are repetitively executed.

In such a manner set forth above, since the discharge refrigerant pressure at the high pressure side is controlled by the compressor 2 to compel the air stream at the outlet of the sub condenser 4 to be maintained at the temperature TAO while permitting the air stream at the outlet of the evaporator to be maintained at the target air temperature $Tof_{int}$, the compressor 2 can be operated and the blow off temperature can be stabilized while the compressor 2 and the refrigeration cycle can be protected while, additionally, the evaporator 7 is prevented from freezing to achieve an appropriate dehumidification, providing a capability of providing the heating performance and the dehumidifying performance compatibility. Furthermore, by compelling the temperature of the air stream at the outlet of the evaporator 7 to be maintained at the target air temperature $Tof_{int}$, the compression ratio of the compressor is stabilized with no deterioration in the durability of the compressor.

With the vehicle air conditioning apparatus 1, even when the discharge refrigerant pressure of the compressor 2 varies in dependence on variation in the load of the evaporator and the engine rotation speed, since the discharge refrigerant volume of the compressor 2 can be controlled by the compressor control means 100 to compel the same to be rapidly returned to the target refrigerant discharge pressure, the blow off temperature can be stabilized. Further, even when the vehicle compartment reaches the preset temperature, if the water temperature of engine coolant is low, since hot wind is generated not only by the heater core 21 but also by sub condenser 4 to allow the blow off temperature to be maintained at the given temperature, no sense of incompatibility is imparted to the occupant because of rapid decrease in the blow off temperature. Also, even though the driving time interval of the compressor 2 is prolonged, the discharge refrigerant volume of the compressor 2 is decreased in accordance with an increase in the water temperature of engine coolant, providing a capability of saving the drive power required for the compressor 2.

Furthermore, with the vehicle air conditioning apparatus 1 of the presently filed embodiment, since the temperature of the air stream at the outlet of the evaporator 7 is maintained at the target air temperature $\text{Tof}_{int}$ by compelling the intake door 32 to be controlled by the inner and outer air control means 200, appropriate dehumidification can be achieved by the evaporator 7 to preclude the window from being clouded up.

Moreover, although it is preferable for the opening degree of the intake door 32 to be regulated upon detection of the atmospheric temperature and the number of occupants, since no such detecting means are provided in the current vehicle air conditioning apparatus 1, an attempt is made to introduce a slightly increased amount of outer air to prevent the window from being clouded up even in the worst condition so as to maintain the air temperature at the outlet of the evaporator 7 to be slightly low temperature. With such an adjustment, since the load of the evaporator is hard to increase, the discharge refrigerant pressure is hard to increase, and if the compressor 2 is driven at the target air temperature $\text{Tof}_{int}$, the compression ratio excessively increases and forced load is exerted to the compressor 7. In contrast, the vehicle air conditioning apparatus 1 is arranged to drive the compressor 2 at the second target refrigerant discharge pressure $Pd_2$ to compel the compression ratio to be maintained at a rate less than the given value. As a consequence, an excessive increase in operating sounds of the compressor 2 can be avoided, while preventing deterioration in the durability and the reliability of the compressor.

Additionally, the presently filed embodiment set forth above is configured such that the discharge refrigerant volume of the compressor is controlled to cause the compression ratio of the compressor to be less than the given value upon detection of the temperature of the air stream at the outlet of the heat-absorbing inside-vehicle-compartment heat exchanger and, in place thereof, the discharge refrigerant pressure of the compressor may be controlled upon detection of the intake refrigerant pressure of the compressor.

Moreover, the above embodiment is configured to control the inner and outer air control means upon detection of the temperature of the air stream at the outlet of the heat-absorbing inside-vehicle-compartment heat exchanger and, in place thereof, the inner and outer air control means may be controlled upon detections of the moisture in the inside-vehicle-compartment air flow passage or the intake refrigerant pressure of the compressor.

Figure 7:
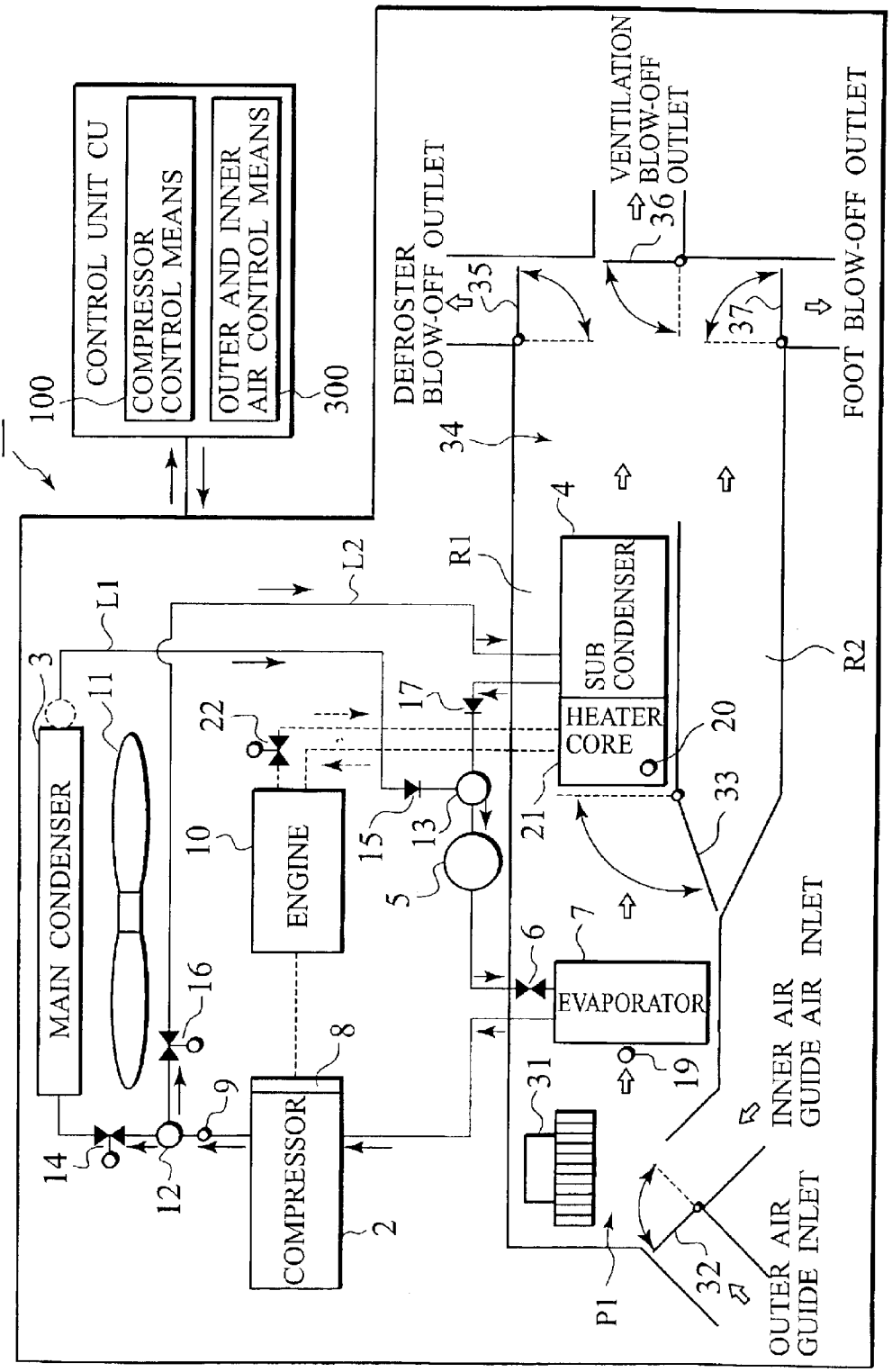
FIG. 7 is a schematic structural view of a vehicle air conditioning apparatus of a second embodiment according to the present invention.

Next, a second embodiment according to the present invention is described below. FIG. 7 is a schematic structural view of a vehicle air conditioning apparatus 51 of the second embodiment of the present invention. Also, in the presently filed embodiment, the same component parts as those of the first embodiment bear the same reference numerals to omit redundant description of the same components.

In the presently filed embodiment, the sub condenser 4 is located in a position available to receive heat of the heater core 21. Here, the position available to receive heat of the heater core 21 means a position in that, even when no air stream occurs in the inside-vehicle-compartment air flow passage P1, heat of the heater core 21 is transferred to the sub condenser 4. In particular, in a case where the sub condenser 4 is placed in a position extremely closer to the heater core 21 and a case where the sub condenser 4 and the heater core 21 are formed in a unitary structure, the sub condenser 4 is available to receive heat of the heater core 21.

Thus, by locating the sub condenser 4 forming the heat-radiating inside-vehicle-compartment heat exchanger at the position available to receive heat of the heater core 21, since the heater core 21, serving as the heating means, increases the temperature load of the sub condenser 4 for thereby instantaneously build up the discharge refrigerant pressure, a remarkably favorite fast response heating performance can be exhibited. Also, in order for the fast response heating performance to be further favorable, the heater core 21 may preferably be located in the inside-vehicle-compartment air flow passage P1 at an upstream side of the sub condenser 4 forming the heat-radiating inside-vehicle-compartment heat exchanger.

Namely, in a case where the heater core 21 is disposed downstream the sub condenser 4, the air stream, that is introduced into the inside-vehicle-compartment air flow passage P1 and passes through the evaporator 7 to form cold wind, tends to be brought into direct contact with the sub condenser 4, resulting in a decrease in the temperature load of the sub condenser 4 while the discharge refrigerant pressure is hard to increase. On the contrary, in a case where the heater core 21 is disposed upstream the sub condenser 4, since the air stream, that is converted into cold wind, tends to be brought into direct contact with the sub condenser 4 via the heater core 21, the temperature load of the condenser 4 is not so lowered and the discharge refrigerant pressure is enabled to further rapidly build up. Further, in this case, since heat of the heater core 21 can be transferred to the sub condenser 4 via the air stream passing through the inside-vehicle-compartment air flow passage P1, the transfer efficiency of heat to be transferred from the heater core 21 to the sub condenser 4 is more preferably improved, enabling a further favorable fast response heating performance to be exhibited.

Further, in order for the fast response heating performance to be further favorably improved, the sub condenser 4, forming the heat-radiating inside-vehicle-compartment heat exchanger, and the heater core 21 may preferably be formed in a unitary structure.

Thus, in a case where the sub condenser 4 and the heater core 21 are formed in the unitary structure, since heat of the heater core 21 comes to be directly transferred to the sub condenser 4, the transfer efficiency of heat to be transferred from the heater core 21 to the sub condenser 4 is further improved, a remarkably improved fast response heating performance can be realized.

Furthermore, the presence of the unitary structure between the sub condenser 4 and the heater core 21 is extremely advantageous in view of miniaturization of an entire apparatus and low costs. Here, a method of forming the sub condenser 4 and the heater core 21 in the unitary structure may conceivably include a method of forming a fin of the sub condenser 4 and a fin of the heater core 21 in a unitary structure.

Thus, if the sub condenser 4 is placed in the position available to receive heat from the heater core 21, an increase in the water temperature of engine coolant is reflected in a decrease in the amount of heat radiation of the sub condenser 4 and the amount of heat absorption of the evaporator 7 is lowered. Like in the first embodiment, if approach is made to detect the air temperature at the outlet of the evaporator 7 for controlling the intake door 32 to compel the air temperature at the outlet of the evaporator 7 to be closer to the target air temperature, the air temperature at the outlet of the evaporator 7 has a slow response with respect to variation in water temperature of engine coolant, resulting in overshooting in the opening degree of the intake door 32 to cause hunting. As a consequence, the air temperature at the outlet of the evaporator 7 is not converged to the target air temperature, resulting in various issues such as occurrence of a sudden cloud and an inability of achieving appropriate heating.

Figure 8:
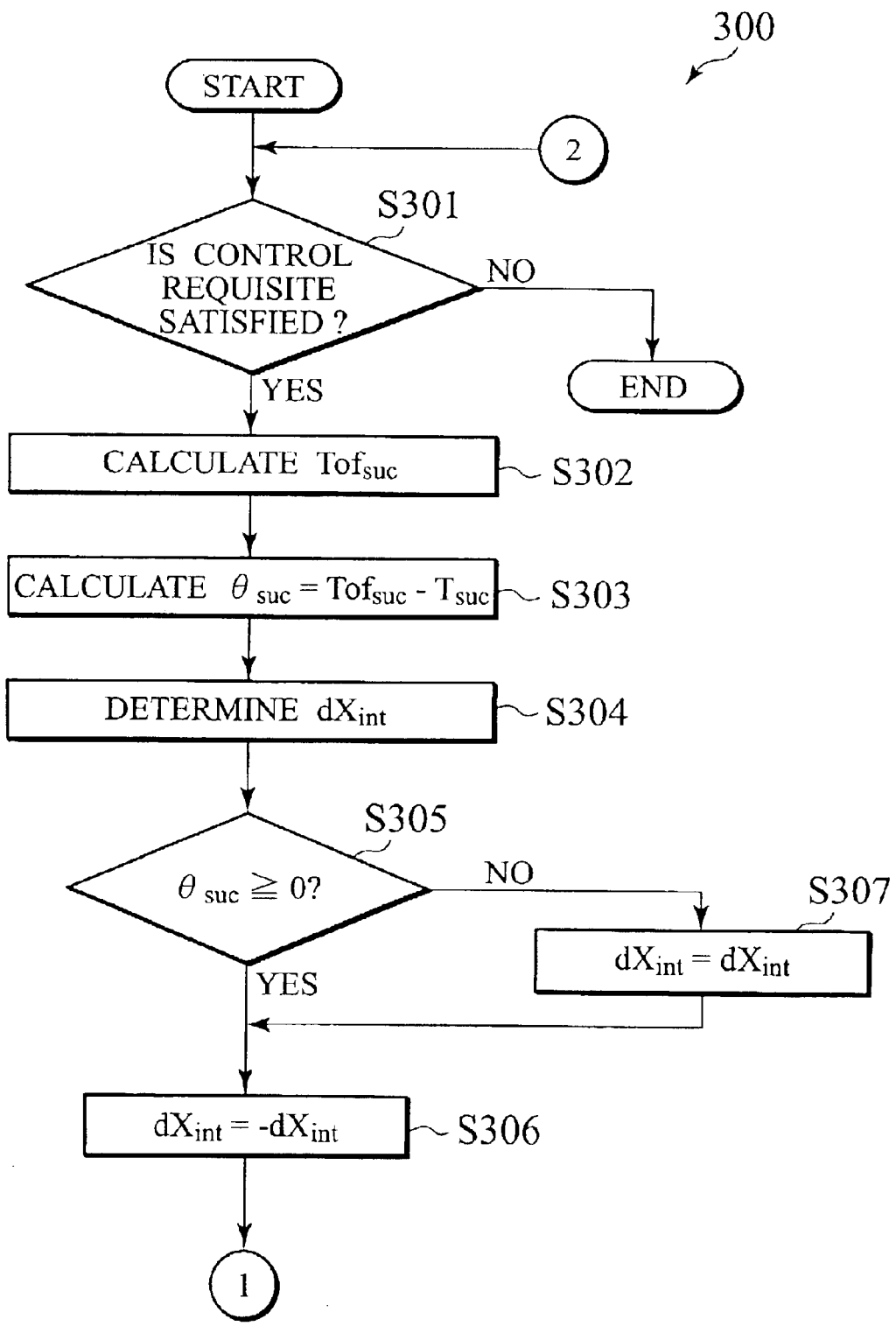
FIG. 8 is a flowchart illustrating a control sequence of the intake door to be executed by an inner and outer air control means of the second embodiment.
Figure 9:
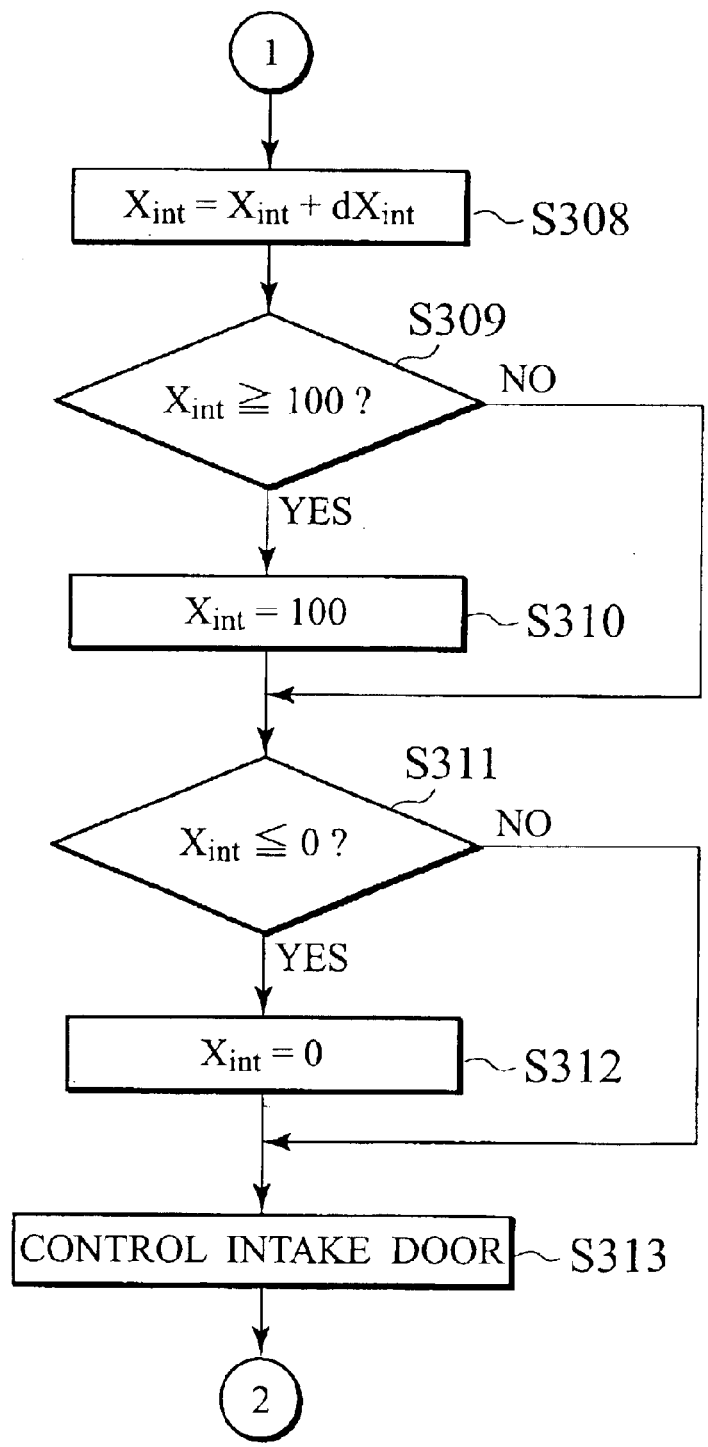
FIG. 9 is a flowchart illustrating a control sequence of the intake door to be executed by the inner and outer air control means of the second embodiment.

To this end, the structure of the presently filed embodiment incorporates the sensor 19, serving as the inlet temperature detection means that detects the temperature of the air stream to be introduced into the evaporator 7, that is disposed at a position close proximity to the inlet of the evaporator 7, and an inner and outer air stream control means 300 that is provided for permitting the temperature of the air stream at the inlet of the evaporator 7 to be maintained at the target air temperature. The inner and outer air stream control means 300 is formed by the program stored in the memory of the control unit CU. FIGS. 8 and 9 show flowcharts illustrating control sequences of the inner and outer air stream control means 300 for controlling the intake door 32.

As shown in the figure, if the program starts, first, discrimination is made to see whether a control prerequisite of the vehicle air conditioning apparatus 1 is satisfied (step S301). The control prerequisite is similar to that of step 101 of the compressor control means 100. If the control unit CU discriminates that the control prerequisite is satisfied and the following control is executed and, in contrast, in the absence of the control prerequisite, control is terminated.

Figure 10:
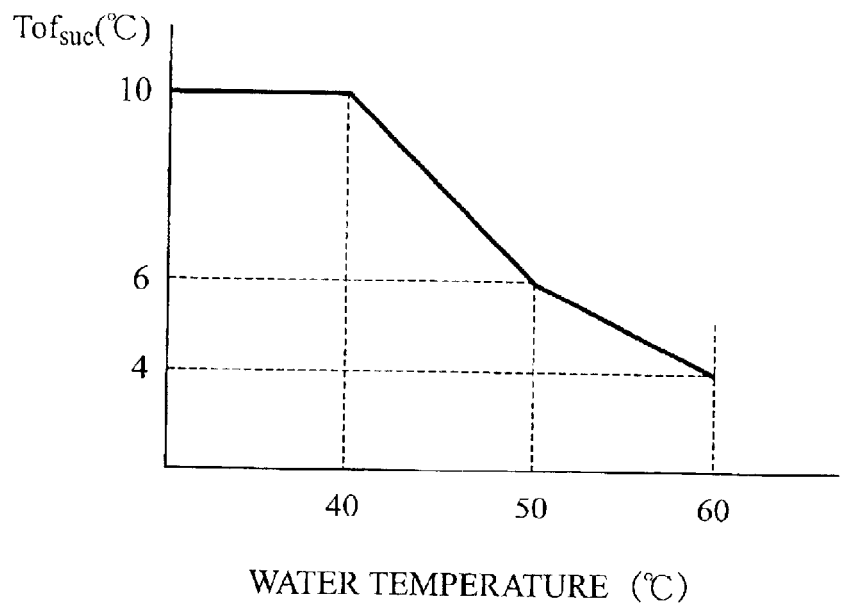
FIG. 10 is a graph showing the relationship between a water temperature of engine coolant and a target air temperature at an inlet of an evaporator.

In the presence of the control prerequisite, operation is implemented to calculate the target air temperature $\text{Tof}_{suc}$ (step S302). This value is for the temperature of the air stream at the outlet of the evaporator 7 to be settled to a value $\text{Tof}_{int}$ that is described in the first embodiment and determined on the basis of the output of the sensor 20 that serves as the heating temperature detection means to detect the water temperature of engine coolant flowing through the heater core 21. As shown in FIG. 10, $\text{Tof}_{suc}$ decreases as the water temperature of engine coolant increases.

Figure 11:
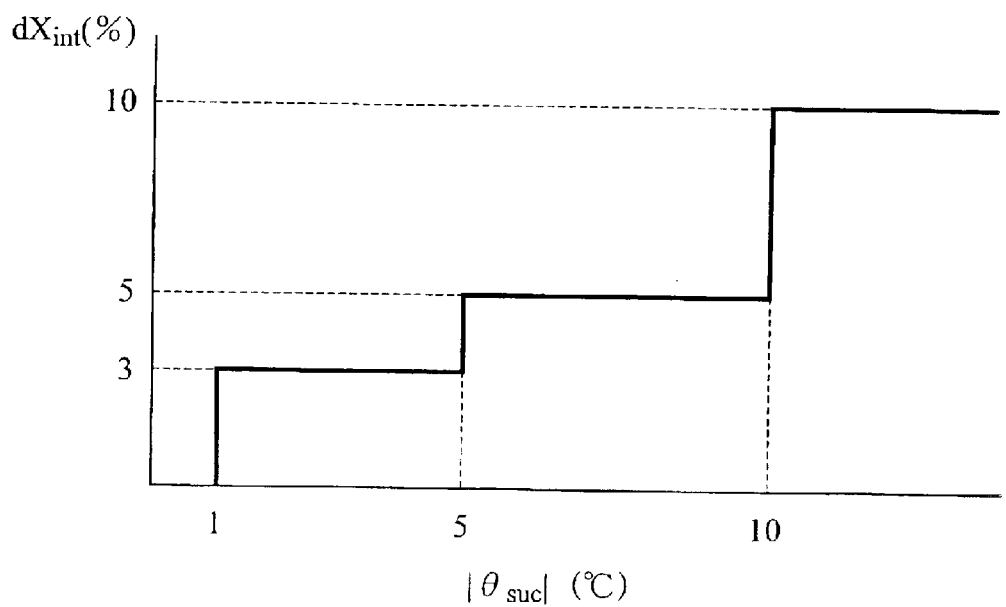
FIG. 11 is a graph showing the relationship between an absolute value, in difference between the target air temperature at the inlet of the evaporator and the target air temperature at the inlet of the evaporator, and an amount of displacement of the intake door.

Next, operation is executed to calculate a difference $\theta_{suc}$ between $\text{Tof}_{suc}$ and an actual temperature $T_{suc}$, detected by the sensor 19, of the air stream at the inlet of the evaporator 7 (step S303) and, based on an resulting output, the amount $dX_{int}$ of displacement of the intake door 32 is determined (step S304). As set forth above, $X_{int}$ is a numeric value indicative of the open and closing statuses of the inner air guide inlet and the outer air guide inlet regulated by the intake door 32 and varies in the range of 0~100 (%) in which, when the intake door 32 fully closes the inner air guide inlet and fully opens the outer air guide inlet, this status is assigned to 100 and a reversed state is assigned to 0. As shown in FIG. 11, $dX_{int}$ is set stepwise in dependence on an absolute value of $\theta_{suc}$.

Subsequently, discrimination is made to see whether $\theta_{suc}$ exceeds 0 (step S305) and if $\theta_{suc}$ exceeds 0 (that is when $T_{suc}$ is lower than $\text{Tof}_{suc}$), then since the rate of the inner air stream needs to be increased, $dX_{int}$ is converted into a negative value such that the intake door 32 is shifted in a direction to open the inner air guide inlet (step S306). On the contrary, if $\theta_{suc}$ is less than 0 (that is when $T_{suc}$ is higher than $\text{Tof}_{suc}$), then since the rate of the outer air stream needs to be increased, $dX_{int}$ remains unchanged in the positive value such that the intake door 32 is shifted in a direction to open the outer air guide inlet (step S307).

In succeeding step, $dX_{int}$ is added to $X_{int}$ to provide new $X_{int}$ (step S308), and discrimination is executed to see whether $X_{int}$ exceeds a value of 100 (step S309) whereupon if $X_{int}$ exceeds a value of 100, then $X_{int}$ is assigned as 100 (step S310). Also, discrimination is executed to see whether $X_{int}$ less than a value of 0 (step S311) whereupon if $X_{int}$ is less than a value of 0, then $X_{int}$ is assigned as 0 (step S312). After the intake door 32 has been drivingly controlled on the basis of $X_{int}$ thus obtained (step S313), flow is routed back to step S301 and the above steps are repetitively executed.

In this way, the discharge refrigerant pressure at the high pressure side of the compressor 2 is controlled such that the air stream at the outlet of the sub condenser 4 is maintained at the temperature of TAO and the air stream at the outlet of the evaporator 7 is maintained at the target temperature $\text{Tof}_{int}$. This enables the blow-off temperature to be stabilized while operating the compressor 2 and the compressor 2 and the refrigeration cycle to be protected from damages. Further, since the evaporator 7 is prevented from freezing while enabling appropriate dehumidification to be performed, a heating performance and dehumidifying performance compatibility can be obtained. Also, the presence of ability in that the air stream at the outlet of the evaporator 7 is maintained at the target temperature $\text{Tof}_{int}$ allows the compression ratio of the compressor to be stabilized, with no deterioration in durability of the compressor.

Figure 12:
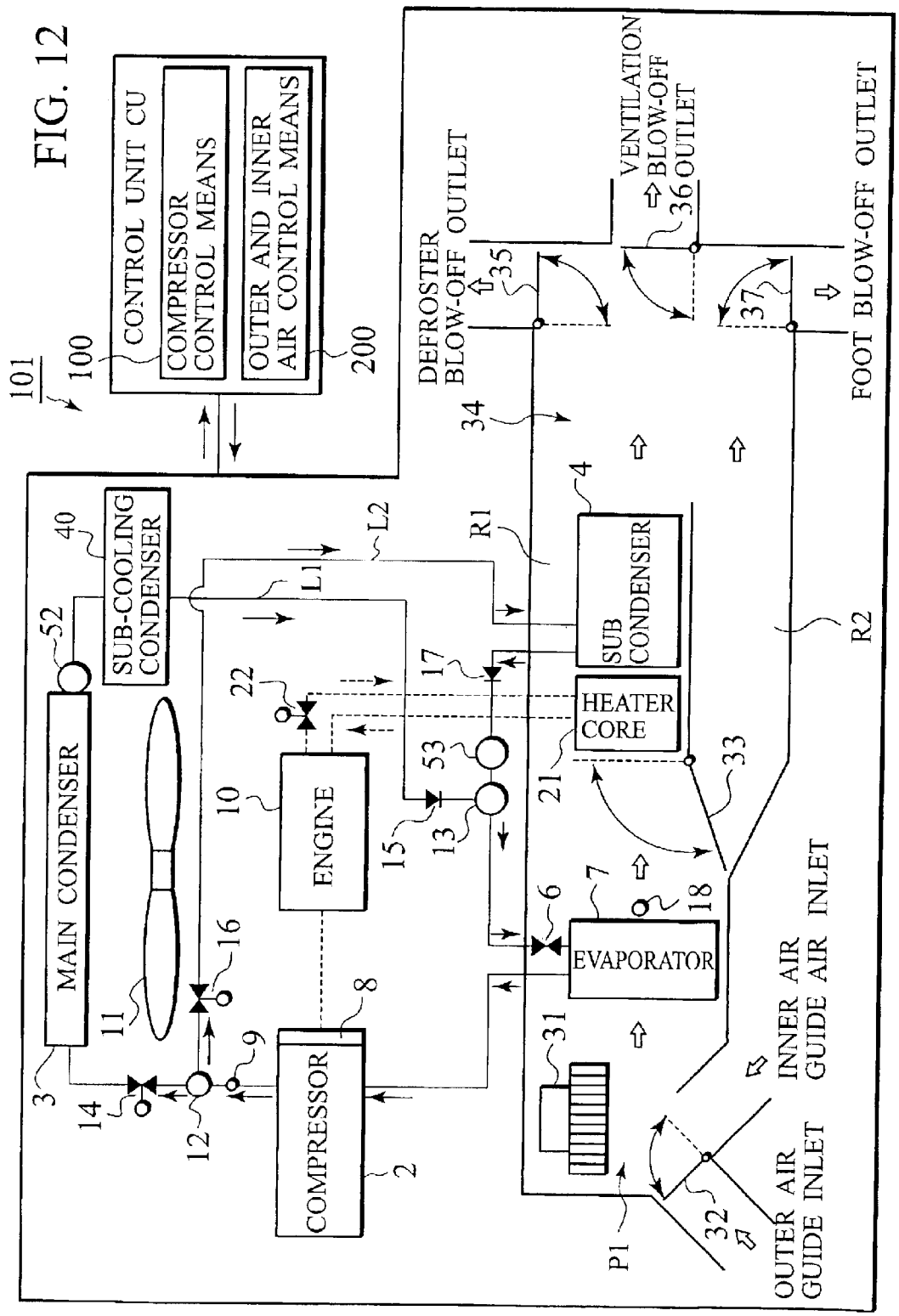
FIG. 12 is a schematic structural view of a vehicle air conditioning apparatus of a third embodiment according to the present invention.

Next, a third embodiment according to the present invention is described below. FIG. 12 is a schematic structural view of a vehicle air conditioning apparatus 101 of the third embodiment of the present invention. Also, in the presently filed embodiment, the same component parts as those of the first embodiment bear the same reference numerals to omit redundant description of the same components.

The vehicle air conditioning apparatus of the presently filed embodiment has a structure that includes a first liquid tank 52 disposed at the outlet of the main condenser 3, a sub-cooling condenser 40 disposed in an aft stage of the first liquid tank 52 and serving as a heat radiator, and a second liquid tank 53 disposed between the outlet of the sub condenser 4 and a three-way valve 13. That is, the vehicle air conditioning apparatus 101 of the presently filed embodiment differs from the vehicle air conditioning apparatus of the first embodiment in that the liquid tank 5 is altered.

The sub-cooling condenser 40 is a condenser that permit liquid refrigerant, which is condensed in the main condenser during the cooling mode and contained gas is separated in the first liquid tank 52, to be cooled in a further excessively cooled state whereby such a technology enables refrigerant to be excessively cooled for thereby increasing a cycle efficiency during the cooling mode while increasing the power saving effect.

Additionally, as in the presently filed embodiment, due to the structure in which the first liquid tank 52 is disposed in a line L1 through which refrigerant flows only during the cooling mode and the second liquid tank 53 is disposed in a line L2 through which refrigerant flows only during the heating mode while the sub-cooling condenser 40 serving as the heat radiator is disposed in the aft stage of the first liquid tank 52, both the first and second liquid tanks 52, 53 are enabled to have respective liquid volumes suitable for the cooling and heating modes.

Also, it is useless to say that the vehicle air conditioning apparatus 101 of the presently filed embodiment is provided with not only the various advantages set forth above but also, as previously described above in conjunction with the first embodiment, the function in which control of the control unit CU (for the compressor control means 100 and the inner and outer air control means 200) is executed to stabilize the blow-off temperature.

Further, the principal concept of locating the first and second liquid tanks 52, 53 and the sub-cooling condenser 40 as incorporated in the presently filed embodiment may also be applied to the second embodiment and, in this case, it is useless to say that the vehicle air conditioning apparatus 101 of the second embodiment is also controlled by the control unit CU (for the compressor control means 100 and the inner and outer air control means 200) to stabilize the blow-off temperature.

Moreover, in the first, second, and third embodiments, while the discharge refrigerant pressure of the compressor is detected to control the discharge refrigerant volume of the compressor so as to allow the blow-off temperature to be closer to a value below the given value, in place of this technology, the discharge refrigerant temperature of the compressor and the temperature of the air stream at the outlet of the heat-radiating inside-vehicle-compartment heat exchanger may be detected to allow the discharge refrigerant volume of the compressor to be controlled.

Further, in the first, second, and third embodiments, while the heat radiator is adapted to radiate heat of engine coolant into the air stream passing through the inside-vehicle-compartment air flow passage, in place thereof, it may be altered to radiate heat of vehicle-drive-system coolant, other than engine coolant, such as coolant of a motor of an electric vehicle and stack coolant of a fuel cell powered vehicle.

Furthermore, in the first, second and third embodiments, while the compressor clutch is turned off to be shifted in the heating mode achieved only by the heat radiator, in place thereof, the discharge refrigerant volume of the compressor is minimized responsive to the control signal delivered from the control unit CU to substantially preclude the heat pump from being operated for thereby shifting the heating mode to be achieved only by the heat radiator.

Additionally, the heating means for heating the sub condenser is not limited to a particular heat radiator that radiates heat of vehicle-drive-system coolant.

As set forth above, according to the present invention, by providing an ability of controlling the discharge refrigerant volume of the compressor in a way to allow the blow-off temperature to be maintained at the given temperature in response to the blow-off temperature or the numeric value correlated with the blow-off temperature, as the blow-off temperature varies depending on variation in the evaporator load or the engine rotation speed, since the discharge refrigerant volume of the compressor is regulated to compel the blow-off temperature to rapidly return to the given temperature, the blow-off temperature can be stabilized. Also, even when the temperature of the vehicle compartment reaches the given value, if the water temperature of vehicle-drive-system coolant remains at the low level, since hot wind is generated not only by the heater core but also by the heat-radiating inside-vehicle-compartment heat exchanger and maintained at the given temperature, no sense of incompatibility is encountered in the vehicle occupant. Moreover, in this case, since the discharge refrigerant volume of the compressor is decreased in accordance with the increase in the water temperature of vehicle-drive-system coolant, saving of the drive power can be realized.

Further, according to the present invention, the presence of the given temperature, determined to be the target blow-off temperature by which the vehicle compartment is maintained at the set temperature, enables the compressor to be driven in electric power consumption at an irreducible minimum of a demand, with resultant saving in electric drive power.

Furthermore, according to the present invention, in the operation practical area of the compressor in the graph having the ordinates axis plotted with the refrigerant pressure at the outlet of the heat-absorbing inside-vehicle-compartment heat exchanger and the abscissa axis plotted with the discharge refrigerant pressure of the compressor, since the valve-opening characteristic of the expansion valve does not intersect the control valve characteristic of the compressor and has a slope in that the valve-opening characteristic of the expansion valve is lowered in proportion to the increase in the discharge refrigerant pressure, hunting can be prevented and saving of the drive power can be achieved during the air conditioning mode whereas, during the heating mode, the rising speed of the discharge refrigerant pressure can be increased during the initial stage of startup of the compressor and the transition period in which the discharge refrigerant pressure remains at the low level, and thus, it is possible to prevent liquid from being fed back in a stabilized stage in which the discharge refrigerant pressure reaches to the value to some extent. Also, the air conditioning and heating cycle can be established by the single expansion valve, resulting in reduction in the number of component parts of the circle structure and costs.

Furthermore, according to the present invention, because of an ability of controlling the discharge refrigerant volume of the compressor so as to allow the blow-off temperature to be closer to the given temperature while maintaining the compression ratio of the compressor at the value below the given value, as the blow-off temperature varies due to variation in the load of the evaporator or the engine rotation speed, the discharge refrigerant volume of the compressor is regulated to allow the blow-off temperature to be close to the given temperature, thereby enabling the blow-off temperature to be stabilized. Also, even when the vehicle compartment reaches the given temperature, if the water temperature of vehicle-drive-system coolant remains at the low level, hot wind is generated not only by the heat radiator but also by the heat-radiating inside-vehicle-compartment heat exchanger to allow the blow-off temperature to be maintained at the given temperature, no sense of incompatibility is encountered in the vehicle occupant. Also, in this case, since the discharge refrigerant volume is decreased with the increase in the water temperature of vehicle-drive-system coolant, saving of drive power can be realized. Moreover, since the discharge refrigerant volume of the compressor is regulated to allow the compression ratio of the compressor to decrease below the given value, operating noises of the compressor is reduced to provide an improved comfortability, while enabling deterioration of durability and reliability of the compressor to be prevented.

Moreover, according to the present invention, by the presence of ability to control the refrigerant pressure at the high pressure side through the use of the compressor control means to maintain the blow-off temperature at the given temperature while permitting the inner and outer air control means to control the inner and outer air regulating means for thereby maintaining the air stream at the outlet of the endothermic vehicle-compartment heat exchanger at the given temperature, as the blow-off temperature varies, the variable displacement compressor is operated to regulate the discharge refrigerant volume so as to maintain the blow-off temperature at the given temperature, and an ability of such control of the variable displacement compressor prevents excessive increase in pressure at the high pressure side, thereby protecting the compressor and the refrigeration cycle. Also, as the temperature of the air stream at the outlet of the endothermic vehicle-compartment heat exchanger varies, the inner and outer air regulating means is operative to regulate the ratio of flow rates between the inner air stream and the outer air stream so as to maintain the air stream at the outlet of the endothermic vehicle-compartment heat exchanger at the given temperature. Accordingly, it is possible to prevent the heat-absorbing inside-vehicle-compartment heat exchanger from freezing to preclude deterioration in the dehumidifying performance, providing the heating performance and dehumidifying performance compatibility. Additionally, because of a capability wherein the air stream at the outlet of the heat-absorbing inside-vehicle-compartment heat exchanger is maintained at the given temperature, the compression ratio of the compressor can be stabilized, with no probability caused in deterioration in the durability of the compressor.

Further, according to the present invention, because of a capability of controlling the refrigerant pressure at the high pressure side through the use of the compressor control means to maintain the blow-off temperature at the given temperature while permitting the inner and outer air control means to control the inner and outer air regulating means for thereby maintaining the air stream at the outlet of the heat-absorbing inside-vehicle-compartment heat exchanger at the target air temperature for thereby maintaining the air stream at the outlet of the heat-absorbing inside-vehicle-compartment heat exchanger at the given temperature, as the blow-off temperature varies, the variable displacement compressor is operated to regulate the discharge refrigerant volume so as to maintain the blow-off temperature at the given temperature. Also, an ability of such control of the variable displacement compressor prevents excessive increase in pressure at the high pressure side, thereby protecting the compressor and the refrigeration cycle. Also, as the heating temperature of the heating means varies, the associated target air temperature at the inlet of the heat-absorbing inside-vehicle-compartment heat exchanger is calculated and the inner and outer air regulating means is operative to regulate the ratio of flow rates between the inner air stream and the outer air stream so as to maintain the air stream at the inlet of the heat-absorbing inside-vehicle-compartment heat exchanger at the target air temperature whereby the air stream at the outlet of the heat-absorbing inside-vehicle-compartment heat exchanger is maintained at the given temperature. Accordingly, it is possible to prevent the heat-absorbing inside-vehicle-compartment heat exchanger from freezing to preclude deterioration of the dehumidifying performance, providing the heating performance and dehumidifying performance compatibility. Additionally, because of a capability wherein the air stream at the outlet of the heat-absorbing inside-vehicle-compartment heat exchanger is maintained at the given temperature, the compression ratio of the compressor can be stabilized, with no probability caused in deterioration of the durability of the compressor.

The entire content of Japanese Patent Application No. P2002-72788 with a filing date of Mar. 15, 2002, No. P2002-72793, Mar. 15, 2002, and No. P2002-95094, Mar. 29, 2002 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A vehicle air conditioning apparatus comprising:
   a heat-radiating inside-vehicle-compartment heat exchanger adapted to radiate heat of compressed gas-phase refrigerant into an air stream to be blown off to a vehicle compartment for condensing refrigerant;
   expansion means for expanding the refrigerant condensed in the heat-radiating inside-vehicle-compartment heat exchanger;
   a heat-absorbing inside-vehicle-compartment heat exchanger adapted to compel heat of the air stream inside the vehicle compartment to be absorbed by the refrigerant expanded by the expansion means;
   a variable displacement compressor adapted to be driven by an engine to compress the refrigerant evaporated in the heat-absorbing inside-vehicle-compartment heat exchanger;
   blow-off temperature detection means for detecting at least one of a blow-off temperature or a numeric value correlated with the blow-off temperature;
   compressor control means operative to control a discharge refrigerant volume of the variable displacement compressor such that the blow-off temperature lies at a given temperature responsive to a detection result of the blow-off temperature detection means; and
   heating means for heating the heat-radiating inside-vehicle-compartment heat exchanger.

2. The vehicle air conditioning apparatus according to claim 1, wherein the heating means includes a heat radiator that radiates heat of vehicle-compartment drive-system coolant to an air stream in a inside-vehicle-compartment air flow passage.

3. A vehicle air conditioning apparatus comprising:
   a heat-radiating inside-vehicle-compartment heat exchanger adapted to radiate heat of compressed gas-phase refrigerant into an air stream to be blown off to a vehicle compartment for condensing refrigerant;
   expansion means for expanding the refrigerant condensed in the heat-radiating inside-vehicle-compartment heat exchanger:
   a heat-absorbing inside-vehicle-compartment heat exchanger adapted to compel heat of the air stream inside the vehicle compartment to be absorbed by the refrigerant expanded by the expansion means;
   a variable displacement compressor adapted to be driven by an engine to compress the refrigerant evaporated in the heat-absorbing inside-vehicle-compartment heat exchanger;
   blow-off temperature detection means for detecting at least one of a blow-off temperature or a numeric value correlated with the blow-off temperature; and
   compressor control means operative to control a discharge refrigerant volume of the variable displacement compressor such that the blow-off temperature lies at a given temperature responsive to a detection result of the blow-off temperature detection means;

wherein the blow-off temperature detection means includes a sensor that detects a discharge refrigerant temperature of the variable displacement compressor.

4. The A vehicle air conditioning apparatus comprising:
a heat-radiating inside-vehicle-compartment heat exchanger adapted to radiate heat of compressed gas-phase refrigerant into an air stream to be blown off to a vehicle compartment for condensing refrigerant;

expansion means for expanding the refrigerant condensed in the heat-radiating inside-vehicle-compartment heat exchanger;

a heat-absorbing inside-vehicle-compartment heat exchanger adapted to compel heat of the air stream inside the vehicle compartment to be absorbed by the refrigerant expanded by the expansion means;

a variable displacement compressor adapted to be driven by an engine to compress the refrigerant evaporated in the heat-absorbing inside-vehicle-compartment heat exchanger;

blow-off temperature detection means for detecting at least one of a blow-off temperature or a numeric value correlated with the blow-off temperature; and compressor control means operative to control a discharge refrigerant volume of the variable displacement compressor such that the blow-off temperature lies at a given temperature responsive to a detection result of the blow-off temperature detection means;

wherein the given temperature includes a target blow-off temperature to be assigned as a setting temperature of a vehicle compartment.

5. A vehicle air conditioning apparatus comprising:
a heat-radiating inside-vehicle-compartment heat exchanger adapted to radiate heat of compressed gas-phase refrigerant into an air stream to be blown off to a vehicle compartment for condensing refrigerant;

expansion means for expanding the refrigerant condensed in the heat-radiating inside-vehicle-compartment heat exchanger;

a heat-absorbing inside-vehicle-compartment heat exchanger adapted to compel heat of the air stream inside the vehicle compartment to be absorbed by the refrigerant expanded by the expansion means;

a variable displacement compressor adapted to be driven by an engine to compress the refrigerant evaporated in the heat-absorbing inside-vehicle-compartment heat exchanger;

blow-off temperature detection means for detecting at least one of a blow-off temperature or a numeric value correlated with the blow-off temperature; and compressor control means operative to control a discharge refrigerant volume of the variable displacement compressor such that the blow-off temperature lies at a given temperature responsive to a detection result of the blow-off temperature detection means;

wherein the expansion means includes an expansion valve having a valve-opening characteristic that, in a practical operating area of the variable displacement compressor in a graph where an ordinates axis represents a refrigerant pressure of the heat-absorbing inside-vehicle-compartment heat exchanger and an abscissa axis represents a discharge refrigerant pressure of the variable displacement compressor, does not intersect a control valve characteristic of the variable displacement compressor and has a slope which is inclined downward in proportion to the discharge refrigerant pressure.

6. The vehicle air conditioning apparatus according to claim 5, wherein the blow-off temperature detection means includes a sensor that detects a discharge refrigerant pressure of the variable displacement compressor.

7. The vehicle air conditioning apparatus according to claim 5, wherein the blow-off temperature detection means includes a sensor that detects a temperature of an air stream at an outlet of the heat-radiating inside-vehicle-compartment heat exchanger.

8. A vehicle air conditioning apparatus comprising:
a heat-radiating inside-vehicle-compartment heat exchanger adapted to radiate heat of compressed gas-phase refrigerant into an air stream to be blown off to a vehicle compartment for condensing refrigerant;

expansion means for expanding the refrigerant condensed in the heat-radiating inside-vehicle-compartment heat exchanger;

a heat-absorbing inside-vehicle-compartment heat exchanger adapted to compel heat of the air stream inside the vehicle compartment to be absorbed by the refrigerant expanded by the expansion means;

a variable displacement compressor adapted to be driven by an engine to compress the refrigerant evaporated in the heat-absorbing inside-vehicle-compartment heat exchanger;

blow-off temperature detection means for detecting at least one of a blow-off temperature or a numeric value correlated with the blow-off temperature;

compressor control means operative to control a discharge refrigerant volume of the variable displacement compressor such that the blow-off temperature lies at a given temperature responsive to a detection result of the blow-off temperature detection means; and intake refrigerant pressure detection means for detecting an intake refrigerant pressure of the variable displacement compressor or a numeric value correlated with the intake refrigerant pressure, wherein the compressor control means controls a discharge refrigerant volume of the variable displacement compressor such that, in response to a detection result of the intake refrigerant pressure detection means in addition to the detection result of the blow-off temperature detection means, the blow-off temperature becomes closer to a given temperature while maintaining a compression ratio of the variable displacement compressor at a value below a given value.

9. The vehicle air conditioning apparatus according to claim 8, wherein the intake refrigerant pressure detection means includes a sensor that detects a temperature of an air stream at an outlet of the heat-absorbing inside-vehicle-compartment heat exchanger.

10. A vehicle air conditioning apparatus comprising:
a heat-radiating inside-vehicle-compartment heat exchanger adapted to radiate heat of compressed gas-phase refrigerant into an air stream to be blown off to a vehicle compartment for condensing refrigerant;

expansion means for expanding the refrigerant condensed in the heat-radiating inside-vehicle-compartment heat exchanger:

a heat-absorbing inside-vehicle-compartment heat exchanger adapted to compel beat of the air stream inside the vehicle compartment to be absorbed by the refrigerant expanded by the expansion means:

a variable displacement compressor adapted to be driven by an engine to compress the refrigerant evaporated in the heat-absorbing inside-vehicle-compartment heat exchanger;

blow-off temperature detection means for detecting at least one of a blow-off temperature or a numeric value correlated with the blow-off temperature;

compressor control means operative to control a discharge refrigerant volume of the variable displacement compressor such that the blow-off temperature lies at a given temperature responsive to a detection result of the blow-off temperature detection means;

inner and outer and air regulating means for regulating a ratio between an inner air stream and an outer air stream to be introduced into an inside-vehicle-compartment air flow passage;

an outlet temperature detection means for detecting an air temperature at an outlet of the heat-absorbing inside-vehicle-compartment heat exchanger or a numeric value correlated with the air temperature; and inner and outer air control means responsive to a detection result of the outlet temperature detection means to control the inner and outer air regulating means such that an air temperature at an outlet of the heat-absorbing inside-vehicle-compartment heat exchanger lies at a given value.

11. The vehicle air conditioning apparatus according to claim 10, wherein the outlet temperature detection means includes a sensor that detects a moisture of the inside-vehicle-compartment air flow passage.

12. The vehicle air conditioning apparatus according to claim 10, wherein the outlet temperature detection means includes a sensor that detects an intake refrigerant pressure of the variable displacement compressor.

13. The vehicle air conditioning apparatus according to claim 1, further comprising:

inner and outer air regulating means that regulates a ratio between inner and outer air streams to be introduced into an inside-vehicle-compartment air flow passage;

heating temperature detection means that detects a heating temperature of the heating means or a numeric value correlated with the heating temperature;

inlet temperature detection means that detects an air temperature at an inlet of the heat-absorbing inside-vehicle-compartment heat exchanger or a numeric value correlated with the air temperature; and inner and outer air control means operative to calculate a target air temperature at an inlet of the heat-absorbing inside-vehicle-compartment heat exchanger for causing an air temperature at an outlet of the heat-absorbing inside-vehicle-compartment heat exchanger to lie at a given temperature in response to a detection result of the heating temperature detection means while controlling the inner and outer air regulating means for causing an air temperature at an inlet of the heat-absorbing inside-vehicle-compartment heat exchanger to lie at the target air temperature in response to a detection result of the inlet air temperature detection means.

14. A vehicle air conditioning apparatus comprising:

a subcondenser adapted to radiate heat of compressed gas-phase refrigerant into an air stream to be blown off to a vehicle compartment, by condensing refrigerant;

an expander configured to expand the refrigerant condensed by the subcondenser;

an evaporator adapted to compel heat of the air stream inside the vehicle compartment to be absorbed by the refrigerant expanded by the expander;

a variable displacement compressor adapted to be driven by an engine to compress the refrigerant evaporated by the evaporator;

a blow-off temperature detector configured to detect at least one of a blow-off temperature or a numeric value correlated with the blow-off temperature;

a controller configured to control a discharge refrigerant volume of the variable displacement compressor such that the blow-off temperature lies at a given temperature responsive to a detection result of the blow-off temperature detector; and a heater positioned upstream of the subcondenser in the direction of air flow, configured to provide heat to the subcondenser.

* * * * *